(12) United States Patent
Teichrob et al.

(10) Patent No.: US 9,428,348 B2
(45) Date of Patent: Aug. 30, 2016

(54) MOBILE MATERIAL HANDLING AND METERING SYSTEM

(75) Inventors: Gary Teichrob, Chilliwack (CA); Scott Mason, Cultus Lake (CA); Dave Keck, Calgary (CA); James Easden, Chilliwack (CA); Dave Looney, Eugene, OR (US); Keevan Howell, Eugene, OR (US); Arlen Rexius, Eugene, OR (US)

(73) Assignee: TY-CROP MANUFACTURING LTD., Rosedale, British Colombia (CA)

( * ) Notice: Subject to any disclaimer, the term of this patent is extended or adjusted under 35 U.S.C. 154(b) by 924 days.

(21) Appl. No.: 13/452,422

(22) Filed: Apr. 20, 2012

(65) Prior Publication Data

US 2012/0219391 A1 Aug. 30, 2012

Related U.S. Application Data

(63) Continuation-in-part of application No. 12/909,357, filed on Oct. 21, 2010, now Pat. No. 8,944,740.

(51) Int. Cl.
*B65G 67/40* (2006.01)
*B65D 88/32* (2006.01)
*B65G 63/00* (2006.01)

(52) U.S. Cl.
CPC ............... *B65G 67/40* (2013.01); *B65D 88/32* (2013.01); *B65G 63/008* (2013.01); *Y10S 294/905* (2013.01); *Y10S 414/122* (2013.01)

(58) Field of Classification Search
CPC .... B65D 88/30; B65D 88/32; B65G 63/008; B65G 67/36
USPC ....... 414/268, 332, 355, 356, 474, 476, 482, 414/483, 573–575, 582, 909, 919; 294/905
See application file for complete search history.

(56) References Cited

U.S. PATENT DOCUMENTS 1,346,990 A 7/1920 Stuart
2,124,687 A 7/1938 Carson
(Continued)

FOREIGN PATENT DOCUMENTS

DE 4235276 A1 * 4/1994 ............ B65D 88/30
GB 2222995 A 3/1990
WO 9950091 A1 10/1999

OTHER PUBLICATIONS

"Sand Silo Sites", FB Industries Inc., Winkler, MB, Canada; Nov. 12, 2010.
(Continued)

*Primary Examiner* — James Keenan
(74) *Attorney, Agent, or Firm* — Holland & Hart LLP

(57) ABSTRACT

A method and system for handling granular material, such as proppant used in hydraulic fracturing in well drilling, is provided. In an operational configuration, a delivery module having conveyors receives and conveys granular material to a delivery location, and one or more mobile storage modules receive, hold and dispense granular material downward to the delivery module. The mobile storage modules comprise a raised, angular container portion for holding granular material. Each mobile storage module may comprise a rock-over chassis for support against ground. A remote control module provides centralized, remote control of the system. Mobile support unit modules may also be provided as a remotely controlled vehicle capable of providing power, control, heating, and the like to other modules. Mobile in-feed elevator modules may also be provided as a remotely controlled vehicle for feeding granular material to mobile storage modules. In a transportation configuration, each module is separately transportable.

26 Claims, 20 Drawing Sheets

(56) References Cited

U.S. PATENT DOCUMENTS

| | | | |
|---|---|---|---|
| 3,086,465 A * | 4/1963 | De Montfort | 102/301 |
| 3,095,097 A * | 6/1963 | Mellow | B65G 47/00 |
| | | | 177/14 |
| 3,231,066 A | 1/1966 | Harrison et al. | |
| 3,265,232 A | 8/1966 | Lythgoe | |
| 3,285,439 A * | 11/1966 | Harverson | B65G 65/00 |
| | | | 198/544 |
| 3,310,161 A | 3/1967 | Kraft, Jr. | |
| 3,314,557 A | 4/1967 | Sackett | |
| 3,501,193 A * | 3/1970 | Gray | B66C 1/663 |
| | | | 294/81.53 |
| 3,530,832 A * | 9/1970 | De Satnick | A01K 31/04 |
| | | | 119/442 |
| 3,567,048 A * | 3/1971 | Whitham | B65G 23/00 |
| | | | 198/633 |
| 3,653,486 A | 4/1972 | McLean et al. | |
| 3,669,245 A | 6/1972 | Wooten et al. | |
| 3,753,506 A | 8/1973 | Palmer | |
| 3,884,346 A | 5/1975 | O'Neill et al. | |
| 3,934,739 A | 1/1976 | Zumsteg et al. | |
| 4,101,019 A * | 7/1978 | Satterwhite | 198/300 |
| 4,187,047 A | 2/1980 | Squifflet, Sr. | |
| 4,198,186 A | 4/1980 | Holdren et al. | |
| 4,268,208 A | 5/1981 | Hankins et al. | |
| 4,319,677 A | 3/1982 | Kipper | |
| 4,330,232 A | 5/1982 | McClaren | |
| 4,337,014 A | 6/1982 | Farnham | |
| 4,345,869 A * | 8/1982 | King | 414/520 |
| 4,387,798 A | 6/1983 | Jamison et al. | |
| 4,392,776 A | 7/1983 | Shum | |
| 4,465,420 A * | 8/1984 | Dillman | 414/332 |
| 4,482,281 A | 11/1984 | Musil | |
| 4,491,216 A | 1/1985 | Sawby | |
| 4,561,821 A | 12/1985 | Dillman | |
| 4,568,239 A | 2/1986 | Sims | |
| 4,624,357 A | 11/1986 | Oury et al. | |
| 4,629,060 A | 12/1986 | Schlegel et al. | |
| 4,701,095 A * | 10/1987 | Berryman et al. | 414/332 |
| 4,813,526 A | 3/1989 | Belanger | |
| 4,917,560 A | 4/1990 | Murray et al. | |
| 4,924,993 A | 5/1990 | Buxton | |
| 4,944,646 A | 7/1990 | Edwards et al. | |
| 5,087,155 A | 2/1992 | Herman et al. | |
| 5,125,771 A | 6/1992 | Herman et al. | |
| 5,129,508 A | 7/1992 | Shelstad | |
| 5,141,528 A * | 8/1992 | Boczkiewicz et al. | 95/291 |
| 5,203,442 A | 4/1993 | Oury et al. | |
| 5,203,628 A | 4/1993 | Hamm | |
| 5,277,489 A | 1/1994 | Hamm | |
| 5,297,665 A | 3/1994 | Smith | |
| 5,339,996 A | 8/1994 | Dubbert et al. | |
| 5,340,259 A * | 8/1994 | Flaskey | 414/24.5 |
| 5,427,497 A | 6/1995 | Dillman | |
| 5,431,523 A * | 7/1995 | Ferguson | 414/525.9 |
| 5,577,618 A | 11/1996 | Rafferty | |
| 5,634,716 A | 6/1997 | Westall et al. | |
| 5,640,996 A | 6/1997 | Schlecht et al. | |
| 5,865,300 A | 2/1999 | Newsome | |
| 6,135,171 A | 10/2000 | Weakly | |
| 6,186,311 B1 | 2/2001 | Conner | |
| 6,186,654 B1 | 2/2001 | Gunteret, Jr. et al. | |
| 6,283,269 B1 | 9/2001 | Mayer | |
| 6,293,689 B1 | 9/2001 | Guntert, Jr. et al. | |
| 6,360,876 B1 | 3/2002 | Nohl et al. | |
| 6,367,610 B1 | 4/2002 | Fortenbery et al. | |
| 6,378,686 B1 | 4/2002 | Mayer et al. | |
| 6,386,352 B1 | 5/2002 | Baker | |
| 6,527,428 B2 | 3/2003 | Guntert, Jr. et al. | |
| 6,540,039 B1 | 4/2003 | Yu | |
| 6,543,622 B1 | 4/2003 | Fridman | |
| 6,688,450 B2 | 2/2004 | Speers | |
| 6,827,198 B1 | 12/2004 | Costanzo | |
| 6,866,071 B2 | 3/2005 | Fischer | |
| 6,910,586 B2 | 6/2005 | McCloskey | |
| 6,929,113 B1 | 8/2005 | Hoover et al. | |
| 6,986,294 B2 | 1/2006 | Fromme et al. | |
| 7,150,352 B2 | 12/2006 | Cotter et al. | |
| 7,198,278 B2 | 4/2007 | Donaldson | |
| 7,223,059 B2 | 5/2007 | Smith et al. | |
| 7,255,194 B2 | 8/2007 | Lim | |
| 7,296,676 B2 | 11/2007 | Smith et al. | |
| 7,789,217 B2 | 9/2010 | Fischer | |
| 7,887,110 B2 * | 2/2011 | Cheng | B66C 1/34 |
| | | | 294/82.17 |
| 7,946,416 B2 | 5/2011 | Grose et al. | |
| 8,025,140 B2 | 9/2011 | Whyte et al. | |
| 8,033,376 B2 | 10/2011 | Toews | |
| 8,251,199 B2 | 8/2012 | Tebbe et al. | |
| 8,322,507 B2 | 12/2012 | DeMong et al. | |
| 8,348,044 B2 | 1/2013 | Tebbe et al. | |
| 8,408,377 B2 | 4/2013 | Werlinger | |
| 8,640,855 B2 | 2/2014 | Brobst | |
| 8,944,239 B2 | 2/2015 | Campbell | |
| 8,944,740 B2 | 2/2015 | Teichrob et al. | |
| 2007/0029170 A1 | 2/2007 | Anagnost | |
| 2008/0008562 A1 | 1/2008 | Beckel et al. | |
| 2008/0179054 A1 | 7/2008 | McGough et al. | |
| 2009/0078410 A1 * | 3/2009 | Krenek et al. | 166/244.1 |
| 2010/0008750 A1 * | 1/2010 | Jones | B65G 41/008 |
| | | | 414/339 |
| 2014/0023467 A1 * | 1/2014 | Begley et al. | 414/332 |
| 2015/0044004 A1 | 2/2015 | Pham et al. | |
| 2015/0336747 A1 | 11/2015 | Teichrob et al. | |
| 2015/0353291 A1 | 12/2015 | Teichrob et al. | |

OTHER PUBLICATIONS

Office Action for U.S. Appl. No. 12/909,357, dated Sep. 20, 2013.
Office Action for U.S. Appl. No. 12/909,357, dated Feb. 27, 2014.
Office Action for U.S. Appl. No. 12/909,357, dated Jul. 31, 2014.
Notice of Allowance for U.S. Appl. No. 12/909,357, dated Sep. 24, 2014.
Office Action (Restriction Requirement) for U.S. Appl. No. 14/286,488, dated Sep. 4, 2015.
Cisco-Eagle, Dual-Direction Discharge Conveyor, http://www.cisco-eagle.com/catalog/c-4220-dual-direction-tilting-discharge-belt-conveyor, 2 pages, downloaded Oct. 1, 2015, © 2015 Cisco-Eagle.
Pro-Belt, Horizontal Curve Design, Design Curves in Overland Conveyors with Confidence, http://www.pro-belt.com/hcurve.htm, 3 pages, downloaded Oct. 1, 2015.
Ryson International, Inc., Vertical Conveyor Systems, Spiral Conveying Solutions, http://www.ryson.com/, 6 pages, downloaded Oct. 1, 2015.

* cited by examiner

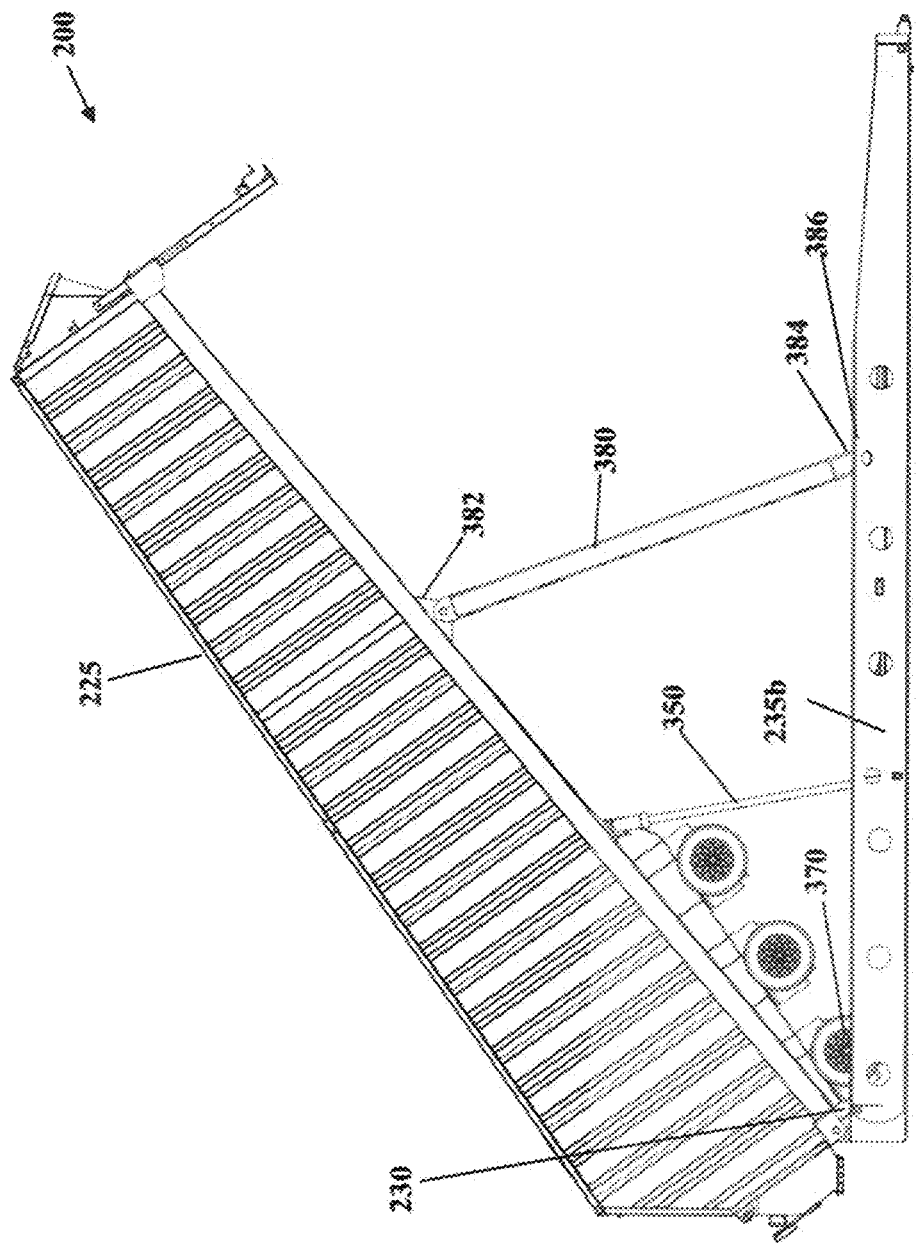

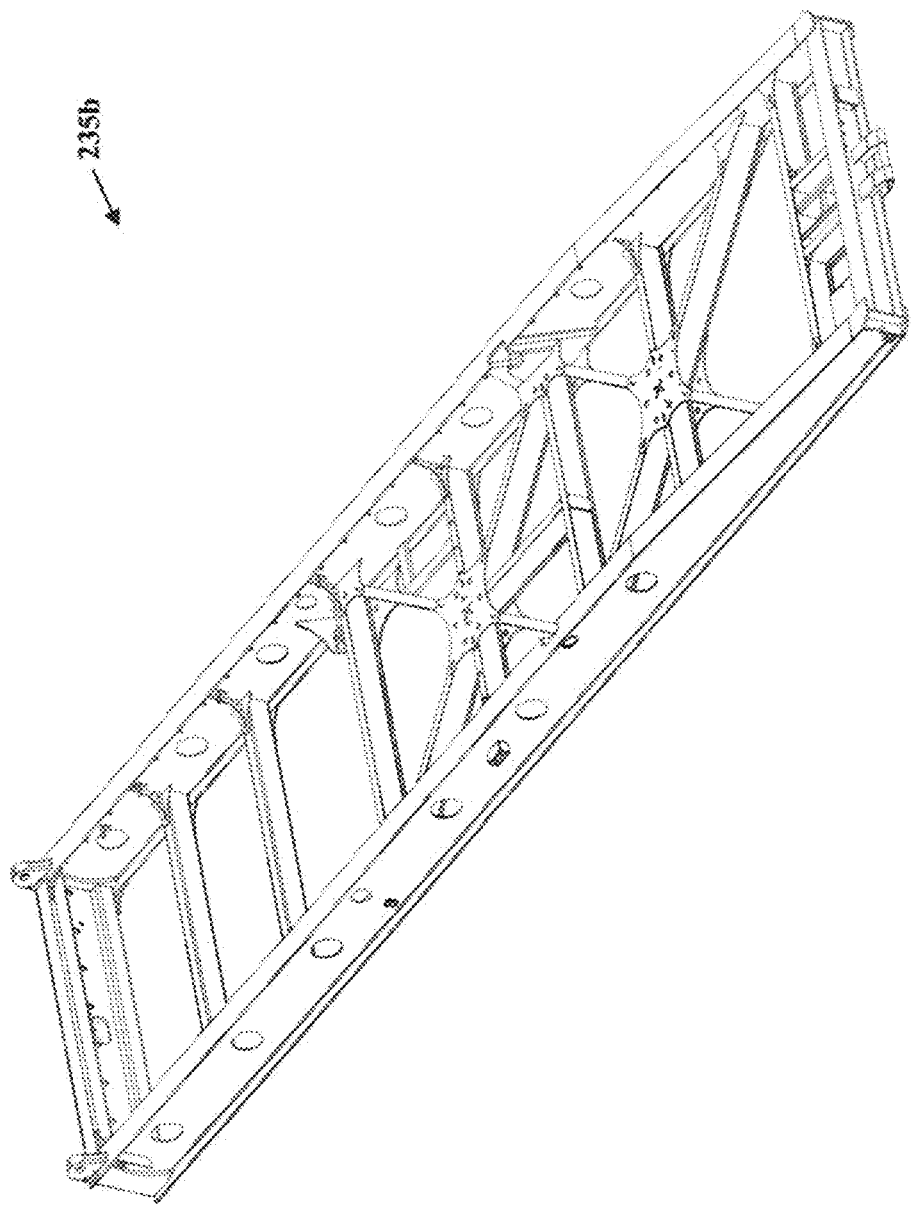

MOBILE MATERIAL HANDLING AND METERING SYSTEM

CROSS-REFERENCE TO RELATED APPLICATIONS

This application is a continuation-in-part of U.S. patent application Ser. No. 12/909,357, filed Oct. 21, 2010, now U.S. Pat. No. 8,944,740, and is herein incorporated by reference.

FIELD OF THE INVENTION

The present invention pertains in general to material handling systems and in particular to a mobile material handling and metering system for storing and delivering granular material, and an associated method.

BACKGROUND

Granular material, such as sand, is used in bulk quantity in a number of applications. For example, in hydraulic fracture drilling by oil and gas and other industries, fracturing fluid, along with a granular proppant material such as sand and/or ceramics, is pumped into a drill well to create and prop open fractures in rock. Often, activities requiring large amounts of granular material are performed in a remote location, requiring granular material to be shipped in for example by road, rail or water.

For such activities, it is desirable to have sufficient and often large amounts of granular material readily available for adequately reliably carrying out operations. For hydraulic fracture drilling, storage facilities may be required, for example, to hold 50,000 cubic feet of proppant, and hence must be adequately large, as well as capable of supporting the resulting weight of proppant. However, in many cases, granular materials are only required over a limited time period, for example during the drilling operations. Thus, large, permanent on-site storage facilities for the required granular materials are often not economical.

Typically, proppant is stored at a well site in fixed vertical silos and supplied by a dry-bulk tanker and blown into the silo. This method of storage requires that the silos are transported on flat-deck trailers and hoisted into position using large cranes. The set-up time for this type of operation may be extensive, for example lasting on the order of days. Additionally, the silo filling operation may require a dry-bulk blower, which is costly, noisy and creates an undesirably large amount of dust. Furthermore, limited site space may place restrictions on overall size of this type of system, and vehicle compliance regulations may limit overall dimensions of components, such as silos, of system which are to be transported by vehicles such as flat-deck trailers.

United States Patent Application Publication No. 2008/0008562 discloses a method of transporting and storing an oilfield proppant, wherein proppant is transported to and accumulated at a storage facility. However, the storage facility is in the form of a large building which is not well-suited for portability.

U.S. Pat. No. 6,293,689 discloses a multi-trailer mobile concrete batching and mixing plant, including a concrete silo trailer and an aggregate trailer. However, this plant comprises a specific, closed arrangement of trailers and is limited in the amount of material that can be stored and in the rate at which material can be added or removed from the plant.

United States Patent Application Publication No. 2008/0179054 discloses a method and system for expandable storage and metering of proppant or other materials. A portable storage and metering device is transported to a well site and there expanded and filled with proppant, which is metered out as required. However, this approach is limited in scale of proppant material that can be stored and metered.

Therefore there is a need for a method and system for mobile storage and delivery of granular material that is not subject to one or more limitations of the prior art.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and system handling granular material. In accordance with an aspect of the present invention, there is provided a system for handling granular material, the system comprising: a delivery module configured, in a delivery module operational configuration, to receive said granular material and to convey said granular material to a predetermined delivery location; one or more mobile storage modules adjacent to the delivery module, each of the one or more mobile storage modules configured, in a mobile storage module operational configuration, to hold and dispense said granular material downward to the delivery module; and a remote control module configured to facilitate centralized, remote control of one or more other portions of the system, for example the delivery module and the one or more mobile storage modules.

In accordance with another aspect of the present invention, there is provided a method for handling granular material, the method comprising: providing a delivery module configured to receive said granular material and to convey said granular material to a predetermined delivery location; providing one or more mobile storage modules adjacent to the delivery module, each of the one or more mobile storage modules configured to hold and dispense said granular material downward to the delivery module; and providing a remote control module configured to facilitate centralized, remote control of one or more of: the delivery module; and at least one of the one or more mobile storage modules.

BRIEF DESCRIPTION OF THE FIGURES

These and other features of the invention will become more apparent in the following detailed description in which reference is made to the appended drawings.

FIGS. 4A and 4B illustrate, in elevation view, mobile storage modules in an operational configuration, in accordance with embodiments of the invention.

FIGS. 5A and 5B illustrates frames of a mobile storage module, in accordance with embodiments of the invention.

DETAILED DESCRIPTION OF THE INVENTION

Definitions

Figure 1A:
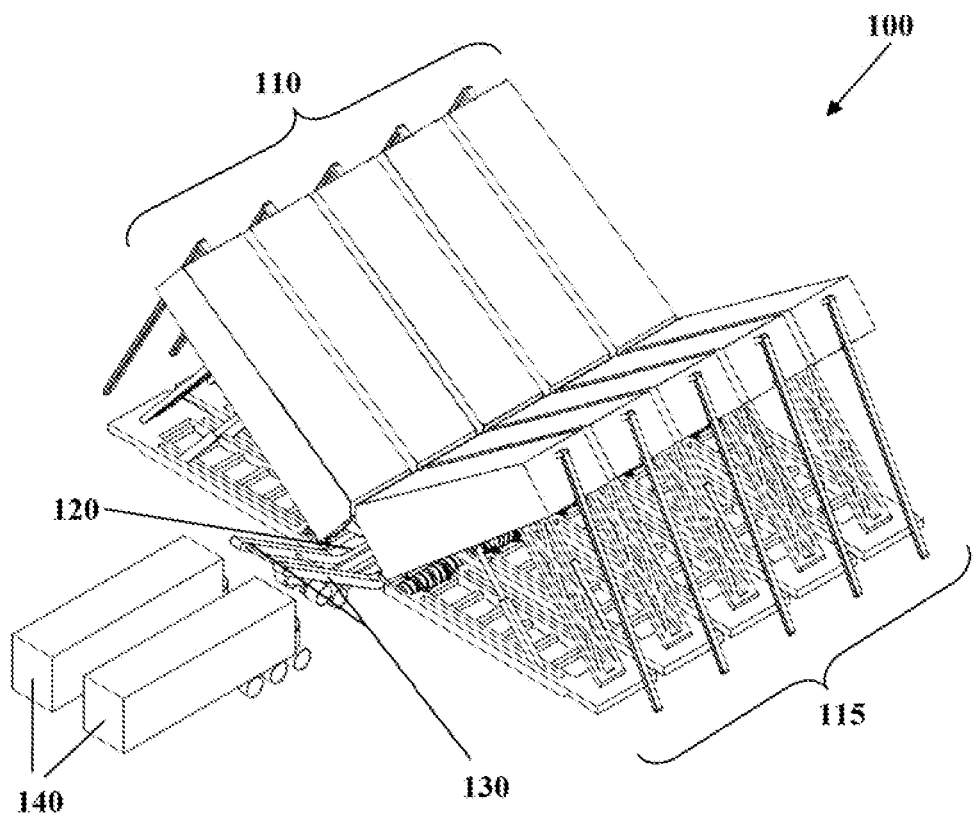
FIGS. 1A and 1B illustrate systems for handling granular material, in accordance with embodiments of the invention.

The term "granular material" is used to define a flow-able material comprising solid macroscopic particles, such as sand, gravel, or the like.

The term "proppant" is used to define a granular material used in drilling, for example by oil and gas industries. Proppant comprises appropriately sized and shaped particles which may be mixed with fracturing fluid to "prop" fractures open after a hydraulic fracturing treatment. Proppant may comprise naturally occurring sand grains of a predetermined size, or engineered materials, such as resin-coated sand, ceramic materials, sintered bauxite, or the like.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

An aspect of the present invention provides for a system for handling granular material, for example for storage and delivery of proppant for use in hydraulic fracturing at a drill well site. The system comprises a delivery module configured to receive said granular material at a reception area thereof and to convey said granular material to a predetermined delivery location. The delivery module may comprise one or more mobile powered conveyor systems, for example at least partially for substantially horizontal conveyance of the granular material. The system further comprises one or more mobile storage modules, each configured to hold said granular material and to dispense said granular material downward to the delivery module. In an operational configuration, the mobile storage modules are arranged adjacent to the delivery module. In a transportation configuration, the mobile storage modules may be configured and towed as semi-trailers and may comprise a container pivotably connected to a base, which may be raised into position for gravity-assisted dispensing of granular material. The delivery module may also further be configured in a transportation configuration for towing as a semi-trailer. The system further comprises a remote control module configured to facilitate centralized, remote control of one or more other portions of the system, such as the mobile storage modules and delivery modules.

The system may further comprise one or more mobile support unit modules, each mobile support unit module configured to provide power, control signals, or both to one or more other system components, including the delivery module and the one or more mobile storage modules. Power provided by the one or more mobile support unit modules may be used for operation, deployment, or the like, or a combination thereof. A mobile support unit module may comprise portions or all of the remote control module, or the mobile support unit module may be substantially separate from the remote control module.

The system may further comprise one or more mobile in-feed conveyor modules, each in-feed conveyor module configured to convey material such as proppant to the mobile storage modules when in the operational configuration. The in-feed conveyor module may be provided as a remotely-controlled, self-propelled vehicle. The in-feed conveyor module further comprises an elevator or conveyor for raising granular material from a source to an input port of a mobile storage module. The conveyor or elevator may be reconfigurable between a transportation configuration and an operational configuration.

In some embodiments, a mobile module may be provided having selected attributes and functionalities of both a mobile support unit module and an in-feed conveyor module. Thus, for example, an in-feed conveyor module may be configured to provide hydraulic power, heating, starting power, control signals, and the like, to one or more other modules such as mobile storage modules and delivery modules. Similarly, a mobile power module may additionally or alternatively be configured to convey material to the mobile storage modules via a conveyor or elevator operatively coupled thereto.

Another aspect of the present invention provides for a delivery module for handling granular material, the delivery module as described above. Another aspect of the present invention provides for a mobile storage module for handling granular material, the mobile storage module as described above.

Another aspect of the present invention provides for a mobile support unit module for providing power to components of a system, the mobile support unit module as described above.

FIG. 1A illustrates a system 100 for handling granular material in accordance with embodiments of the present invention. The system 100 is illustrated as arranged in an operational site configuration, with a plurality of mobile storage modules 110, 115 arranged around a delivery module 120. As shown, there are five mobile storage modules 110 in a first bank on one side of the delivery module 120, and five mobile storage modules 115 in a second bank on another side of the delivery module 120 opposite the first bank. However, this number may be reduced or increased. If the number is increased, the delivery module portion 120 may be expanded in length, for example by adding one or more additional conveyors arranged end-to-end. Other arrangements, such as providing plural delivery modules in parallel, may also be used. The mobile storage modules 110, 115 are arranged so that they may individually discharge granular or flow-able material such as proppant onto one or more, centrally located main conveyors of the delivery module 120. The granular material is conveyed by the main conveyors to one or more discharge conveyors 130, which convey the material to a height appropriate to allow the material to feed one or more blender modules 140. Each blender module 140 may be a mobile unit used to blend fracking chemicals, proppant and bulk fluid. Alternatively, the discharge conveyors 130 may be configured for delivering granular material to another appropriate location or equipment, for example to re-load a bulk tanker during well-site decommissioning.

Figure 1B:
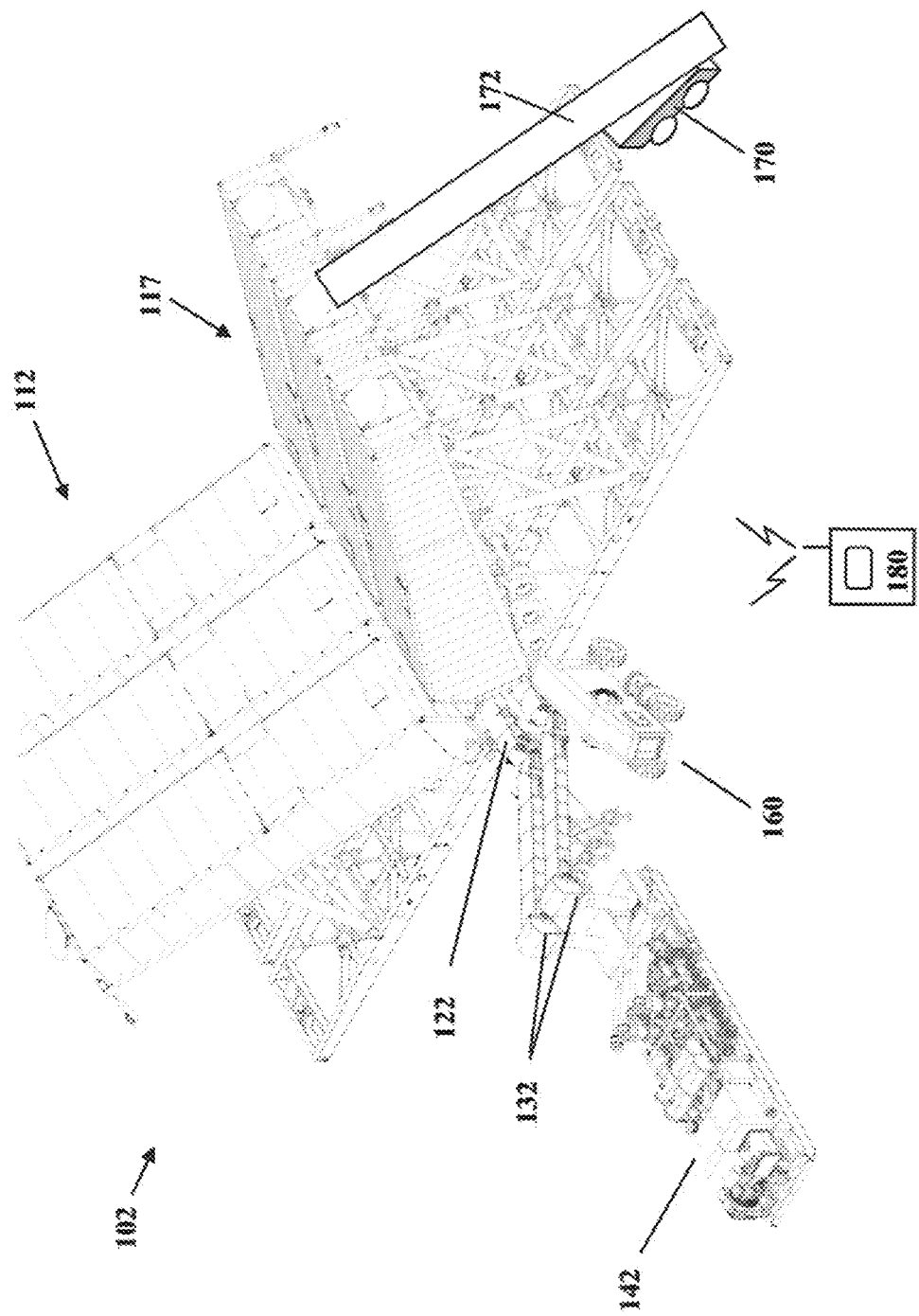

FIG. 1B illustrates a system 102 for handling granular material in accordance with embodiments of the present invention, also arranged in an operational site configuration, with banks 112, 117 of mobile storage modules arranged around a delivery module 122. The mobile storage modules discharge granular or flow-able material such as proppant onto one or more centrally located main conveyors. The granular material is conveyed by the main conveyors to two discharge conveyors 132 and from there to a blender module 142. Alternatively, the discharge conveyors 132 may be configured for delivering granular material to another appropriate location.

FIG. 1B further illustrates a mobile support unit module 160 of the system 102. Although a single mobile support unit module is illustrated, plural mobile support unit modules may be provided. The mobile support unit module 160 is configured as a four-wheeled module configured to provide power to the mobile storage modules, delivery modules, or both. Power may be used for deployment, operation, or both, or the like, of the various modules. The mobile support unit module may be configured for towing various modules into position. The mobile power unit may contain one or more hydraulic power packs for providing power to other modules of the system. The hydraulic power pack may be operatively coupled to the other modules via hydraulic transmission lines or hoses (not shown).

FIG. 1B further illustrates an optional mobile in-feed conveyor module 170 of the system 102. The mobile in-feed conveyor module 170 is provided as a mobile vehicle having a conveyor or elevator 172 configured for delivery of granular material to a mobile storage module which the module 170 is located adjacent to.

FIG. 1B further illustrates a remote operator module 180, which comprises a remote operator interface and a remote radiofrequency transceiver, in accordance with an embodiment of the present invention. The remote operator module 180 may be communicatively coupled to the mobile support unit module and optionally may be coupled to one or more other modules of the system for control thereof. In some embodiments, the remote operator module may further be a remote control module which directly executes centralized control of the system, for example manual, automatic (autonomous) or semi-automatic (semi-autonomous) control. In some embodiments, the remote operator module indirectly executes such centralized control of the system, and thus functions as a portion of a remote control module. For example, the remote operator module may be used to command, direct and/or configure a central controller housed aboard a mobile support unit module or another module. In such embodiments, the remote operator module and portions of the mobile support unit module may operate together as the remote control module.

In some embodiments, there may be a substantially independently variable number of mobile storage modules provided on each side of the mobile storage module. For example, between zero and ten mobile storage modules may be arranged in a first bank along one side of a delivery module, and between zero and ten mobile storage modules may be arranged in a second bank along another side of a delivery module opposite the first bank. The number of mobile storage modules in the first and second bank need not be even. For example, two, three or four mobile storage modules may be arranged in the first bank, and five or six mobile storage modules may be arranged in the second bank.

An aspect of the present invention provides for a method for handling granular material. The method comprises providing a delivery module configured to receive said granular material and to convey said granular material to a predetermined delivery location. The delivery module may be transported to a desired site in a transportation configuration and then converted to an operational configuration for receiving and conveying the granular material. The method further comprises providing one or more mobile storage modules adjacent to the delivery module, each of the one or more mobile storage modules configured to hold and dispense said granular material downward to the delivery module. The mobile storage modules may be transported to a desired site in a transportation configuration and then converted to an operational configuration for holding and dispensing the granular material. The method further comprises providing a remote control module configured to facilitate centralized, remote control of one or more other portions of the system, such as the mobile storage modules and delivery modules.

The method may further comprise providing one or more mobile support unit modules. Each mobile support unit module may be configured to provide operating power to one or more other system components, including the delivery module and the one or more mobile storage modules. Each mobile support unit module may additionally or alternatively be configured to provide control signals to one or more other system components.

Embodiments of the present invention provide for robustness to component failure or mechanical breakdown by providing redundancies for one or more components. For example, the delivery module may comprise plural conveyor systems, and the system may be configured to facilitate continued operation in the event that one or more conveyor systems break down. As another example, each of the mobile storage modules may include interchangeable components, such as hydraulic power packs, which may be connected for use in another mobile storage module should that component of the other mobile storage module fail or break down. Plural components may be also used in series or parallel to augment specific operations. As another example, each of the mobile support unit modules may be interchangeably connectable to different delivery modules, storage modules, or a combination thereof. Hydraulic power packs aboard the mobile support unit modules may thereby be interchangeably connectable in the case of failover, or to provide increased hydraulic power by connecting plural hydraulic power packs to a single load.

Embodiments of the present invention may provide for one or more mechanical features facilitating operation of mobile storage modules and/or delivery modules. For example, one or more modules may comprise a rock-over chassis, which may operate as a semi-trailer chassis in the transportation configuration and as a support structure engaging ground over an adequately large surface area in the operational configuration.

In embodiments of the present invention, some or all of the mobile storage modules, delivery modules, mobile support unit modules and in-feed conveyor modules, are reconfigurable between transportation and operational configurations. In the transportation configuration, each module may be separately transportable in an adequately compact configuration. In the operational configuration, plural modules may be configured and arranged together for accepting, storing, conveying and delivering granular material.

Embodiments of the present invention are modular and expandable, which enables a configurable storage capacity for granular material such as proppant, and/or a configurable capacity for adding and/or removing granular material. The number of mobile storage modules may be adjusted as required, to provide the appropriate capacity. In some embodiments, additional delivery modules or delivery module expansion units may also be provided as desired. Excess storage modules may remain unused or may be used at another site to improve operational efficiencies. Each mobile storage module provides its own storage capacity, and plural mobile storage modules may be loaded with granular material at the same time, thereby facilitating quicker loading or reloading. In some embodiments, plural storage modules may further feed the delivery module at the same time, thereby providing granular material to the delivery module at a higher rate than from a single storage module. Additional mobile support unit modules may be provided and operatively interconnected with the system as required to provide sufficient power, sufficient towing facility, sufficient heating facility, or the like, or a combination thereof.

At least some embodiments of the present invention may provide improvements in terms of operational efficiency, set-up time, transportation requirements, storage and asset tracking requirements, and the like, for example by requiring a relatively small number of component modules when compared with some prior art solutions.

Embodiments of the present invention provide a system comprising a self-erecting, and largely self-sufficient, method of proppant storage and handling. The system can be delivered to site and be operational within hours rather than days and without the current reliance upon specialized plant and equipment.

Mobile Storage Module

The present invention comprises one or more mobile storage modules for holding and dispensing granular material. The number of storage modules utilized may be adjusted as needed for a given operation, from one to a predetermined maximum number which may depend at least in part on delivery module capacity. Each of the mobile storage modules may be reconfigurable between a transportation configuration and an operational or site configuration. In the transportation configuration, each mobile storage module may be configured as a separately transportable trailer or semi-trailer. In the operational configuration, each mobile storage module may be configured as a granular material storage container or silo.

In embodiments of the present invention, each mobile storage module comprises a frame and a container portion, such as an enclosed box, supported by the frame and pivotably coupled thereto. The mobile storage module frame may be referred to and/or associated with a chassis. The container portion is configured, for storing granular material and comprises an input port for receiving the granular material and an output port for dispensing the granular material. The container portion may be substantially enclosed on all sides, except for the input port and output port, which may comprise controllably-sized apertures. The mobile storage module may further comprise an actuating system configured to pivot the container between a lowered position and a raised position. In the raised position, the input port is located above the output port to allow the granular material to flow from input to output with assistance of gravity. The mobile storage module may further comprise a loading system, such as an in-feed elevator, conveyor, bucket conveyor, or the like, operatively coupled to the input port to facilitate loading of granular material into the container portion. In some embodiments, the loading system may be provided at least in part by a separate component, such as a mobile in-feed conveyor module as described herein.

In some embodiments, the mobile storage module may comprise a discharge chute, gate valve, and/or variable discharge aperture valve, operatively coupled to the output port to facilitate controlled and metered flow of granular material from the container portion. The collective flow from container plural mobile storage modules may also be controlled and metered by controlling and metering flows from plural mobile storage modules. The variable discharge chute, metering iris or aperture may facilitate remote, or manual, and ultimately combined, control of the rate of discharge from one or more storage units. A variable aperture at an output port may allow for a substantially continuous control of granular material flow from zero flow to a predetermined maximal flow.

In some embodiments, the mobile storage module may further comprise a hydraulic power pack for powering components such as the actuating system, loading system, and output port valves. In some embodiments, the mobile storage module may be configured into a transportation configuration corresponding to a trailer or semi-trailer complying with predetermined laws, regulations and/or and height and weight requirements, for transportation by a road tractor or other appropriate on-road, off-road, rail or water vehicle. Additionally or alternatively, the mobile storage module may comprise a hydraulic interconnection port for coupling to an external hydraulic power pack, for example provided aboard a mobile support unit module.

Figure 2A:
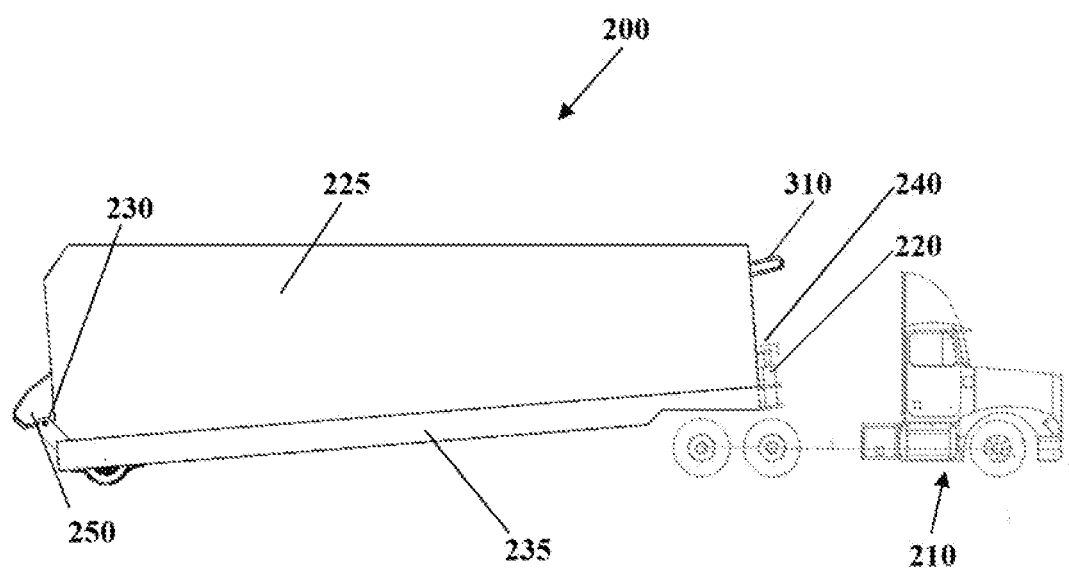
FIGS. 2A and 2B illustrate mobile storage modules in a transportation configuration, in accordance with embodiments of the invention.
Figure 2B:
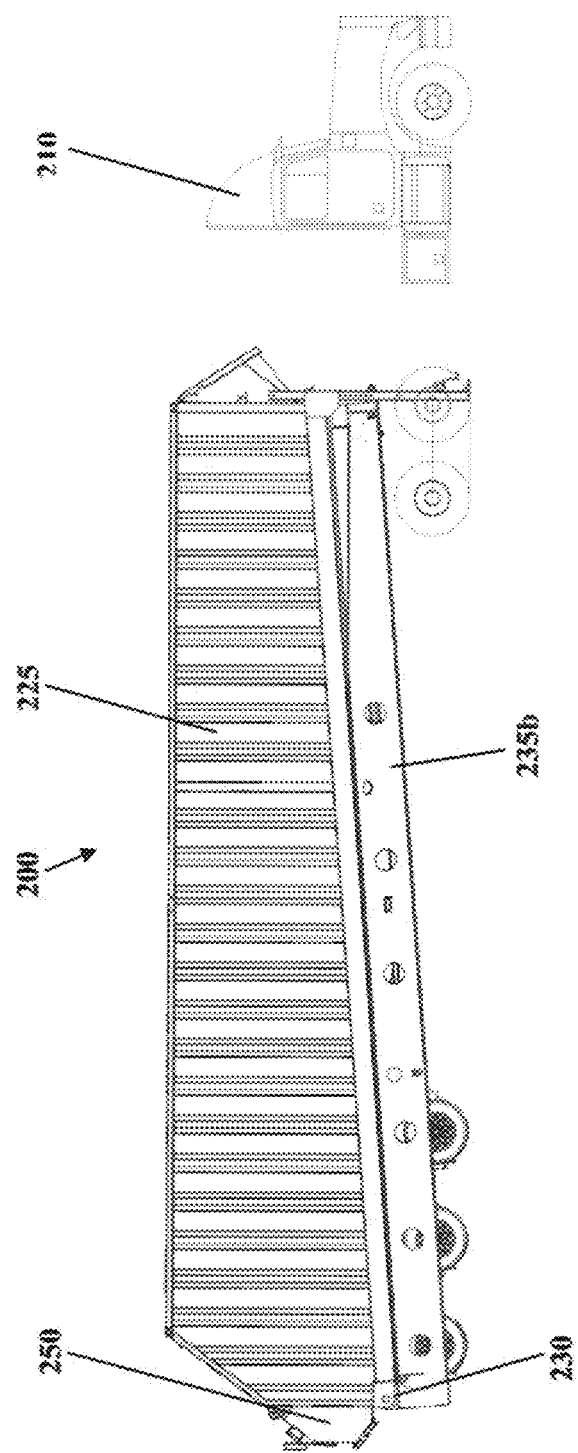
Figure 3A:
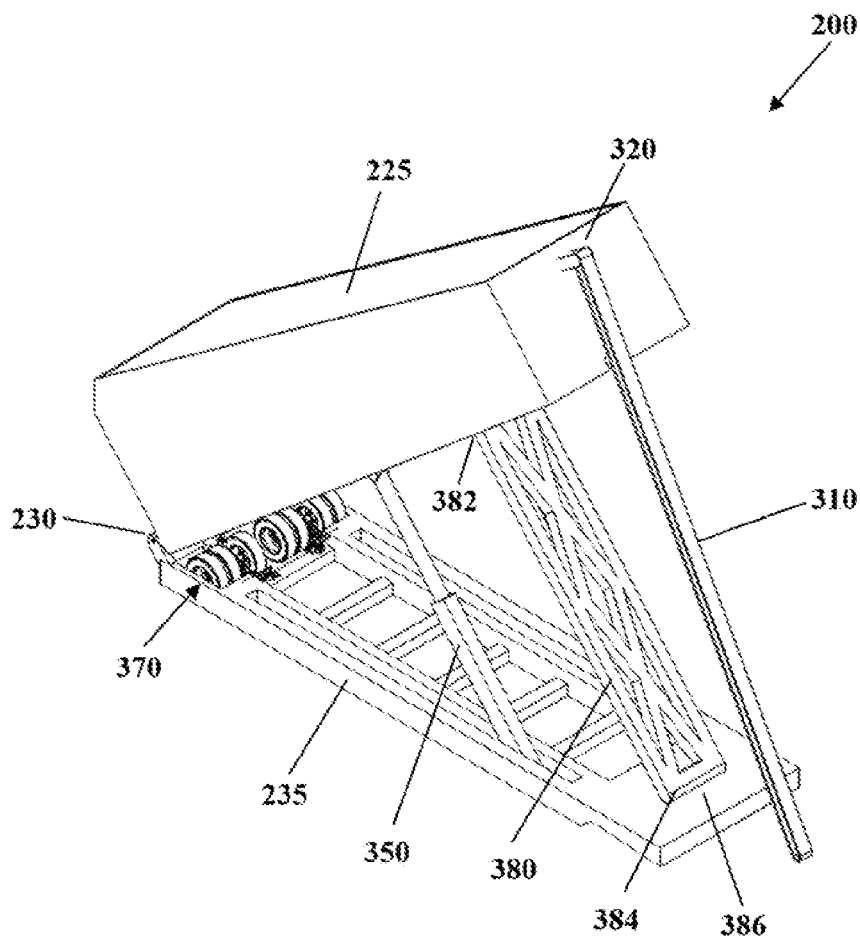
FIGS. 3A and 3B illustrate, in perspective view, mobile storage modules in an operational configuration, in accordance with embodiments of the invention.
Figure 3B:
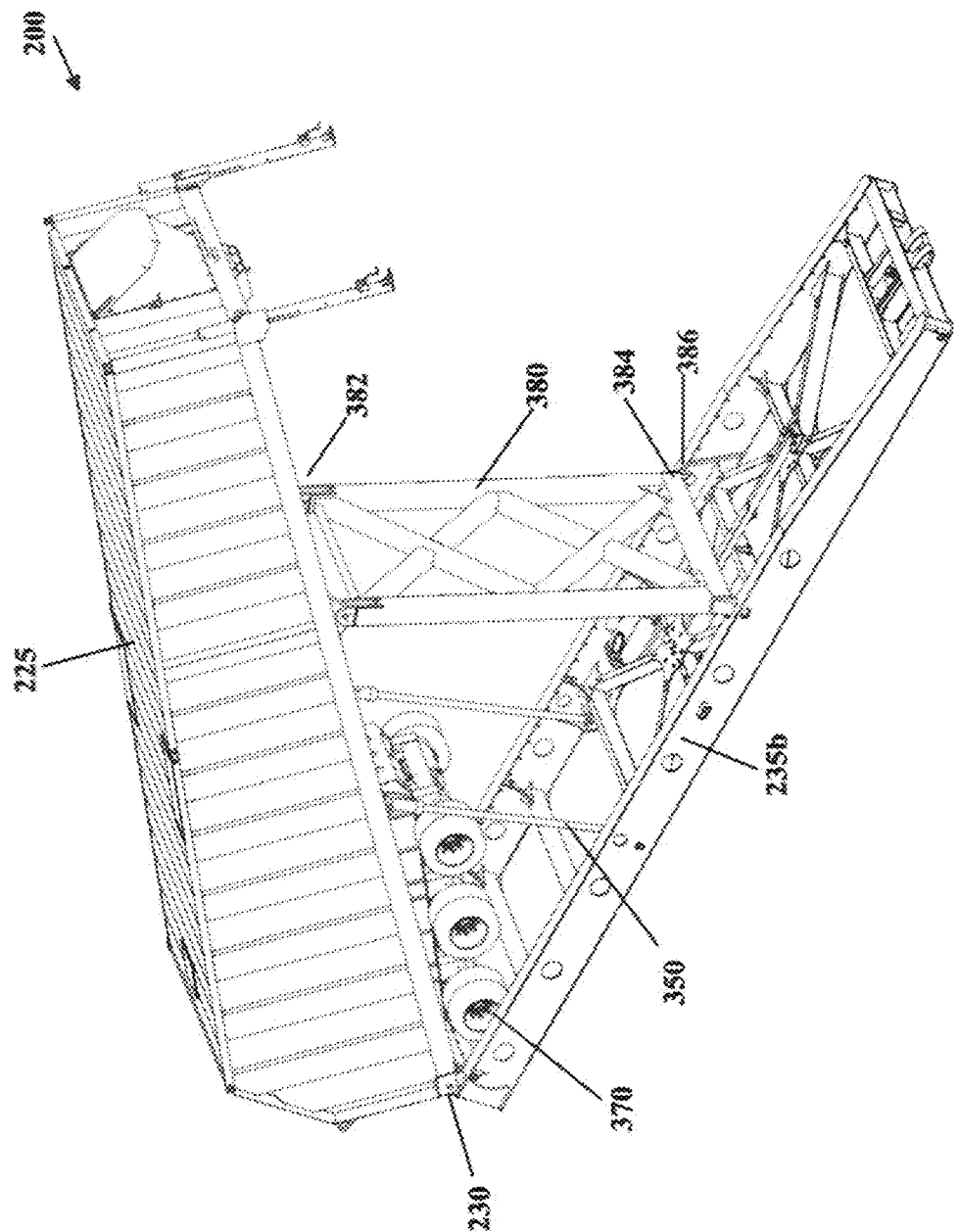

FIGS. 2A and 2B illustrate a mobile storage module 200 arranged in a transportation configuration, as a semi-trailer mounted on a road tractor 210, in accordance with embodiments of the present invention. The semi-trailer may be configured to comply with applicable laws and regulations regarding size, length, weight, and the like. In some embodiments, for example as illustrated in FIGS. 2A and 2B, the container portion 225 of a mobile storage module 200 is formed as a rigid box of a generally rectangular structure, tapered from front to rear so that the container top is at maximum allowable vehicle height when in the transportation configuration, in accordance with predetermined laws and/or transportation regulations. Other features illustrated in FIGS. 2A and 2B are also described herein.

FIGS. 3A, 3B, 4A and 4B illustrate, in perspective and elevation views, respectively, a mobile storage module 200 arranged in a site configuration as an erected silo, in accordance with embodiments of the present invention. The mobile storage module 200 is detached from a road tractor and set up at an appropriate location, for example adjacent to a delivery module and possibly one or more other mobile storage modules. A loading system such as an elevator 310 or other conveyor is connected to an input port 320. The elevator 310 or other conveyor may be provided as part of a separate in-feed conveyor module, rather than part of the mobile storage module 200. Granular material may be loaded onto the elevator 310 from an appropriate container vehicle. The elevator 310 transports the material to the input port 320, where it may be stored in the container portion 225, and/or flowed therethrough to an output port. The mobile storage module 200 comprises, at its base, a frame 235 or 235b, which may be substantially rigid and may span approximately the unit's full length and width. The container portion 225 is raised into position by a actuating system, for example in the form of a hydraulic actuator 350, for example comprising a set of one or more hydraulic piston-cylinder assemblies, which are coupled to the container portion 225 and the frame 235 or 235b and controllably powered by a hydraulic power pack or other source of pressurized hydraulic fluid. The hydraulic actuators may be attached, via pin joints or other pivotable joints, at one end to the container portion 225 and at the other end to the frame 235 or 235b, such that expansion of the hydraulic actuators 350 effects differential movement between the container portion 225 and frame 235 or 235b in an arc, thereby raising and pivoting the container portion 225 from the trailer chassis to a desired or predetermined angle. In some embodiments, the hydraulic actuators are attached to the frame via a pin joint and to the container portion via a trunnion. Embodiments of the present invention may be configured for pivoting the container portion to one or more predetermined or selectable angles, adequate for facilitating flow of material from the input port to the output port under gravity. Such an angle may depend on factors such as the material involved, material grain size, flow-ability, height availability, weight distribution requirements, and the like. In some embodiments, the container portion may be pivoted at an angle of about 40 degrees relative to the frame. In some embodiments, an agitator may be provided for agitating the container portion, thereby controllably increasing flow-ability of granular material at one or more predetermined angles.

As also illustrated in FIGS. 3A, 3B, 4A and 4B, the container portion 225 may comprise a fully enclosed rigid box approximately dimensionally equal to the frame 235 or 235b in length and width. The container portion 225 may be attached to the frame 235 or 235b by way of a hinge 230, for example located rearward of the wheel axles 370. In another embodiment, the wheel axles 370 may be coupled to both the container portion 225 and the frame 235 or 235b and may act as a hinge therebetween.

In some embodiments, one or more hydraulic piston-cylinder assemblies or other substantially linear hydraulic actuators 350 are configured such that, in their collapsed state corresponding to the transportation configuration, one end is substantially higher than the other end. Thus, at commencement of expansion, the actuators can generate a sufficient vertical axis component of thrust to initiate movement of the container portion 225. For a given size of hydraulic actuator, this may be effected by positioning the upper end of the hydraulic actuator, for example a piston rod end thereof, substantially above the frame 340 and possibly into a region located within the convex hull of the container portion 225. In this arrangement, volume which could otherwise potentially be occupied by usable granular payload within the container portion 225 may, in some embodiments, be sacrificed to make room for a portion of the hydraulic actuator or actuators 350.

In some embodiments, the main hydraulic actuators 350 are configured so as to be substantially parallel and within the frame 235 or 235b when in the transportation configuration, with a first end of the main hydraulic actuators 350 connected to the frame 235 or 235b and a second end coupled to a bottom surface of the container portion 225, for example by way of a yoke or lug extending below the container portion 225. In this arrangement, the hydraulic actuators 350 may then substantially lie outside of the convex hull of the container portion 225, thereby increasing potential granular material storage capacity thereof. A second set of one or more initiating hydraulic actuators, for example piston-cylinder assemblies oriented substantially vertically, may be provided, permanently or as needed, for initially raising the container portion 225 to an orientation at which the main hydraulic actuators 350 are able to provide sufficient vertical thrust to raise the box to its full height. At this point, the main hydraulic actuators 350 may take over the container portion load.

For example, as illustrated in FIGS. 2A and 2B, the initiating hydraulic actuators 220 may be located at an end of the container portion 225 opposite the hinge 230, the hydraulic actuators 220 supported by the frame 235 or 235b. In some embodiments, the initiating hydraulic actuators 220 may be pin-jointed to the frame 235 or 235b at a lower end and bear, for example non-rigidly, against a box-mounted cup structure 240 at an upper end. At the point at which the main hydraulic actuators 350 take over lifting duty, the initiating hydraulic actuators 220 may reach maximum stroke and loose contact, at their upper ends, with the box-mounted cup structure 240.

In some embodiments, deployable rigid bracing 380, as illustrated in FIGS. 3A, 3B, 4A and 4B, may be provided. The bracing 380 may be, for example, hinged at one end and free sliding at the other end. The bracing 380 may facilitate supporting the container portion 225 of a mobile storage unit 200 in a raised, operational configuration, thereby reducing or eliminating the need to maintain hydraulic power after the container portion is raised and the rigid bracing 380 locked into place.

In some embodiments, a rigid brace 380 may be provided for bracing the container portion 225 when in the raised position. As illustrated in FIGS. 3 and 4, a first end of the brace 380 may be pin jointed to the underside of the container portion 225 at a predetermined location 382, and a second end 384 of the brace 380 may be free to slide on and/or over the trailer chassis while raising the container portion 225. The second end 384 may be deployed and locked into place at a location 386 of the frame 235 or 235b, for example by forcing the brace to arc over centre into a fixed pocket at the location 386 and then slightly lowering the container portion 225, and/or by pinning the second end 384 to the frame 235 or 235b at location 386.

In some embodiments, after raising the container portion 225, the hydraulic actuators 350 may be de-powered such that temperature induced hydraulic drift does not induce unexpected box loading. The rigid bracing structure 380 may therefore remove dependence upon the hydraulic actuators 350 after said raising. At full elevation the container portion 225 functions at a storage silo. As illustrated, the container portion 225 need not be fully vertical, but may be configured at an angle such as about 40 degrees. The system may provide for a set of mobile self-deploying silos forming a storage accumulator of variable capacity. In some embodiments, the mobile support unit module may be disconnected after de-powering of the hydraulic actuator, and used for other purposes.

In some embodiments of the present invention, the front end of the container portion includes an input port through which the container portion may be loaded with granular material, for example input port 320 as illustrated in FIGS.

3A and 3B. In some embodiments, the front end of the container portion may further include an opening through which the loading system, for example elevator 310 illustrated in FIGS. 3A and 3B may be loaded for storage and transportation when in the transportation configuration. The stored elevator 310 is illustrated in FIGS. 2A and 2B.

As further illustrated in FIGS. 2A, 2B, 4A and 4B, a discharge chute 250 may be provided at the rear of the container portion 225. The discharge chute 250 is configured in-line and in fluid communication with the output port and is oriented and located to position discharged granular material toward the delivery module for reception thereby. For example, the discharge chute 250 may be positioned to discharge the granular material onto a discharge conveyor of the delivery module. In some embodiments, the discharge chute 250 may be positioned low and close to the discharge conveyor to reduce unused volume in the lowermost rear corner of the box.

Figure 5A:
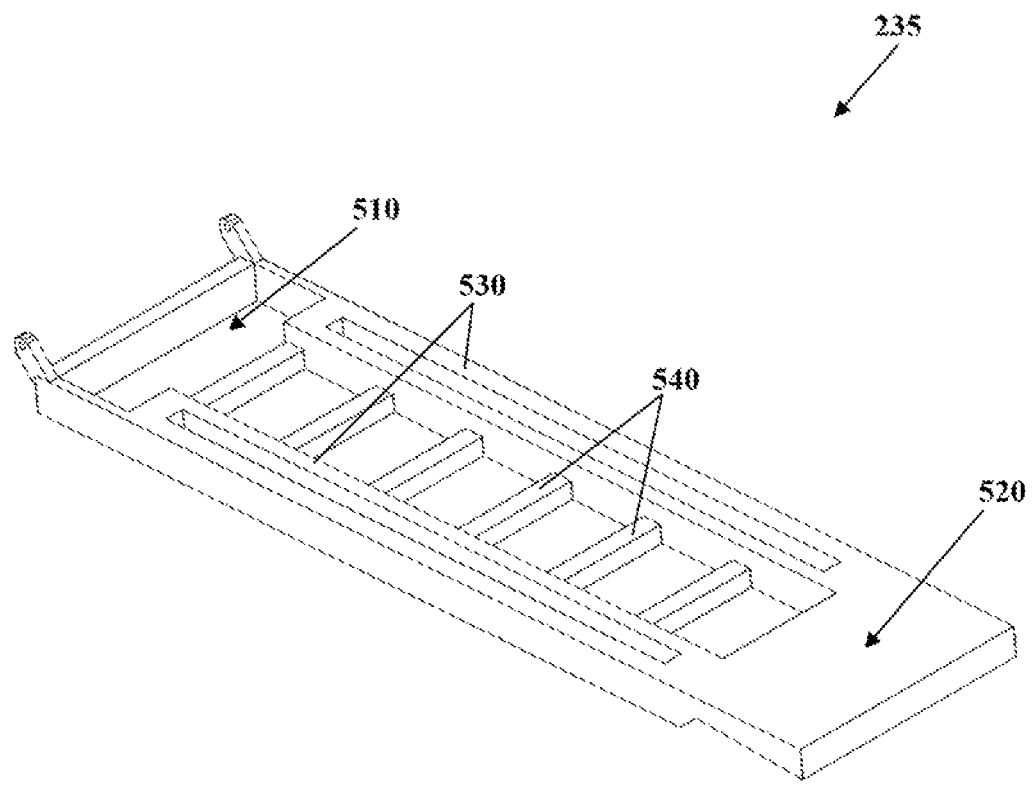

In some embodiments, as illustrated in FIG. 5A, the frame 235 may be constructed from standard structural members, such as steel beams, to form a ladder frame chassis. At one end of the chassis, a set of one or more axles may be fitted at location 510. At the other end of the chassis, a kingpin and coupler structure, or other structure suitable for coupling to a standard or non-standard truck fifth wheel may be provided at location 520.

FIG. 5A further illustrates the frame or trailer chassis 235 comprising a series of longitudinal beams 530 and transverse cross-members 540 oriented to form a rock-over chassis, in accordance with embodiments of the present invention. The chassis may incorporate, toward the front end 520 a coupler structure with a standard SAE kingpin and toward the rear end 510 a suspension assembly and one or more axles and wheels operatively coupled thereto. In some embodiments, the suspension assembly may be located and oriented such that by deflating air springs thereof, the frame 235 can be lowered into contact with the ground to form a full length bearing structure.

FIG. 5B illustrates in more detail the frame or trailer chassis 235*b* as it appears in the configurations of FIGS. 1B, 2B, 3B and 4B.

In some embodiments, the rock-over chassis front end and/or rear end may be lowered to ground by an external crane. In some embodiments, the present invention may comprise hydraulic landing legs operatively coupled to the frame or rock-over chassis. The hydraulic landing legs may extend to contact ground to support the frame 235 or 235*b* while the road tractor drives away, the legs then fully retracted for lowering of the chassis to ground. The frame or rock-over chassis may be configured to present adequate ground contact area so that the ground footprint pressure remains below a predetermined maximum level.

In some embodiments, the in-feed elevator 310, for example as illustrated in FIGS. 3 and 4, may be dimensioned such that the elevator 310 reaches from the input port 320 to substantially ground level, when the elevator 310 is fully deployed and the container portion 225 is elevated to its full height in an operational configuration. Thus, the elevator 310 can transport material from approximately ground level to the height of the input port 320. In some embodiments, the container portion 225 may be raised while empty, and subsequently loaded via the elevator 310 at full elevation, thereby decreasing lifting capacity requirements of the hydraulic actuators 350. In some embodiments, the elevator 310 may be tilted upward and inserted into the container portion 225 for stowage in the transportation configuration, for example as illustrated in FIGS. 2A and 2B.

In some embodiments, the in-feed elevator 310 comprises a continuous belt equipped with cleats, buckets or other features for conveying material upward to the input port. The conveyor belt may be contained within a rigid frame extending approximately the full length of the conveyor belt such that the frame allows the conveyor system to be non-continuously supported along its length. The frame may be hingedly coupled at the upper end to a fixed location on the container portion 225. The frame may be supported by deployable legs or wheels at its lower end to ground. The frame may be connected to a self-propelled vehicle such as a vehicle as described herein. The frame is configured with a predetermined structural rigidity to resist bending due to payload and system weight, and buckling due to belt tension.

Figure 4A:
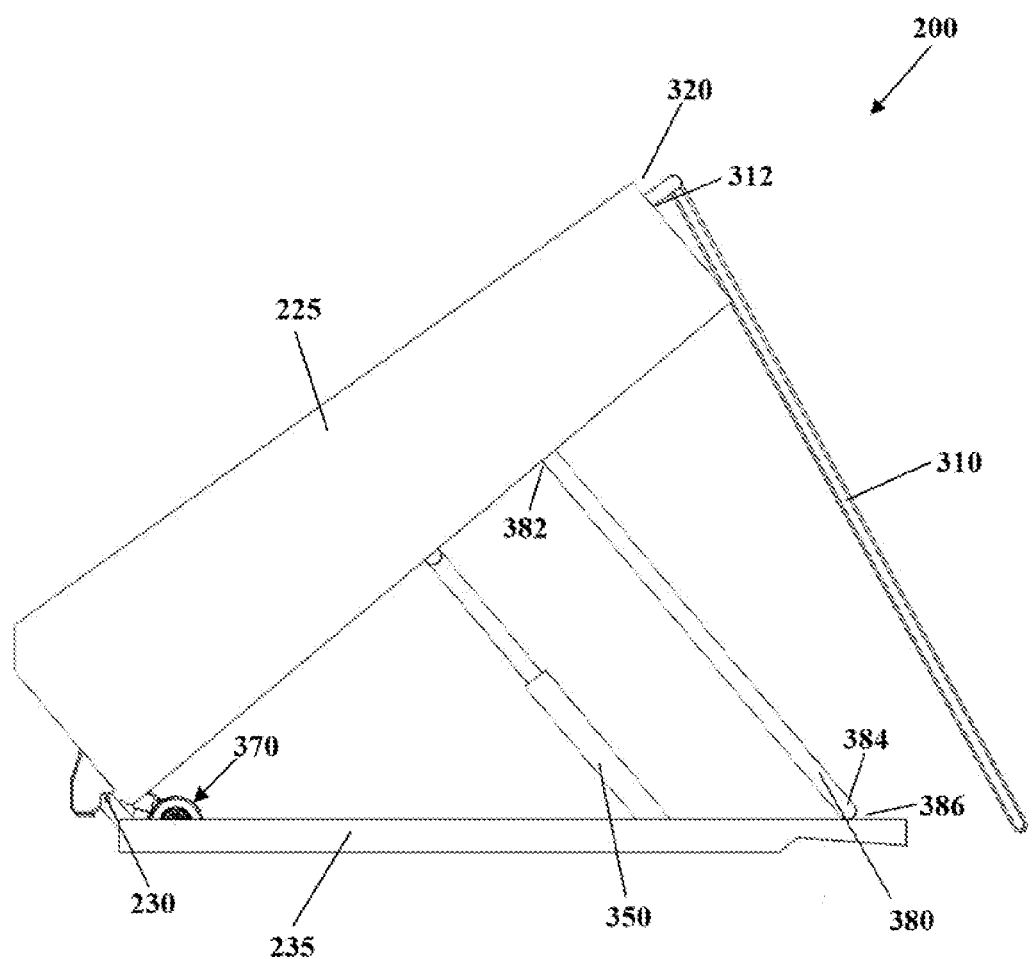

In some embodiments, the in-feed elevator 310 may be deployable from a stored position within the container portion 225, for example stowed and deployed via the container portion input port 320 or another port. Such a port may be located at the upper front corner of the front face of the container portion. The in-feed elevator 310 may, in deployment, be tilted, for example by a hinge, to an approximately vertical orientation such that the lowermost end of the belt is proximate to ground. In some embodiments, the deployed in-feed elevator 310 may be supplied with granular material by a standard low-elevation belly unloading conveyor directly from a series of bulk tankers or other bulk material transporters. In some embodiments, the in-feed elevator may be coupled, at an end proximate to the input port, to a set of one or more outboard rollers. The outboard rollers may be located on both sides of the frame. A pair of channels, configured to accommodate the rollers therein, may also be provided inside of the container portion for stowage of the in-feed elevator in the transportation configuration. In some embodiments, a fixed roller, for example at location 312 as illustrated in FIGS. 4A and 4B, may be located at the lowermost edge of the port receiving the in-feed elevator, the fixed roller bearing against the underside of the in-feed elevator frame, thereby providing support during storage and deployment.

Figure 6:
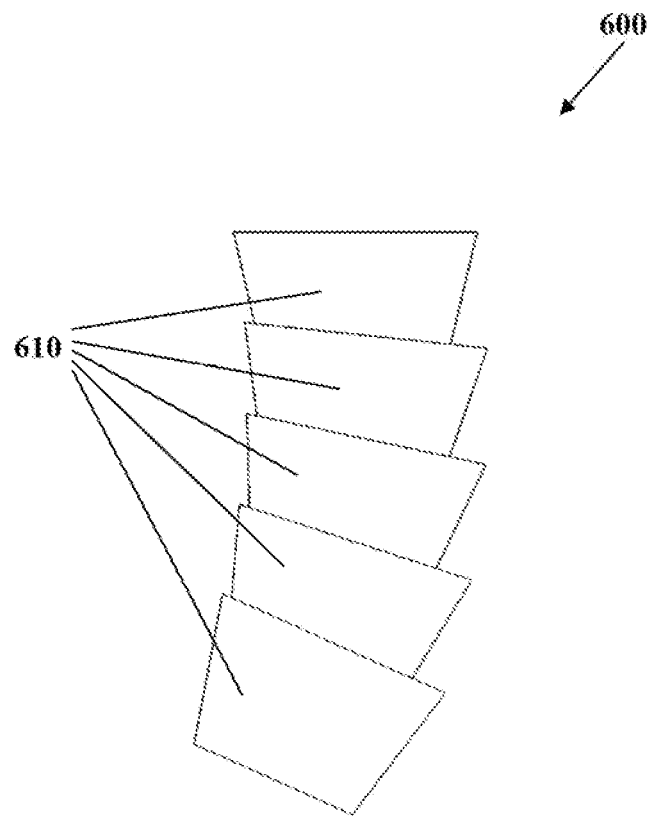
FIG. 6 illustrates a flexible chute for fitting to an output port of a mobile storage module, in accordance with some embodiments of the invention.

FIG. 6 illustrates a flexible chute 600 provided in accordance with some embodiments of the invention. The flexible chute 600 may be fitted to a discharge chute or output port of a mobile storage module for directing granular material to the delivery module. The flexible chute 900 comprises a set of interlocking conical members 610, such as approximately concentric diminishing cones, which are movable relative to each other so that the chute 600 output may be configurably located as needed for granular material discharge.

The rear end of the container portion of a mobile storage module comprises an output port, for example formed in a flat structural wall. In some embodiments, the output port may comprise a hydraulically or manually operated variable aperture or other metering device. In some embodiments, the output port may comprise a slide gate. In some embodiments, a discharge chute may be coupled to the output port.

Figure 7:
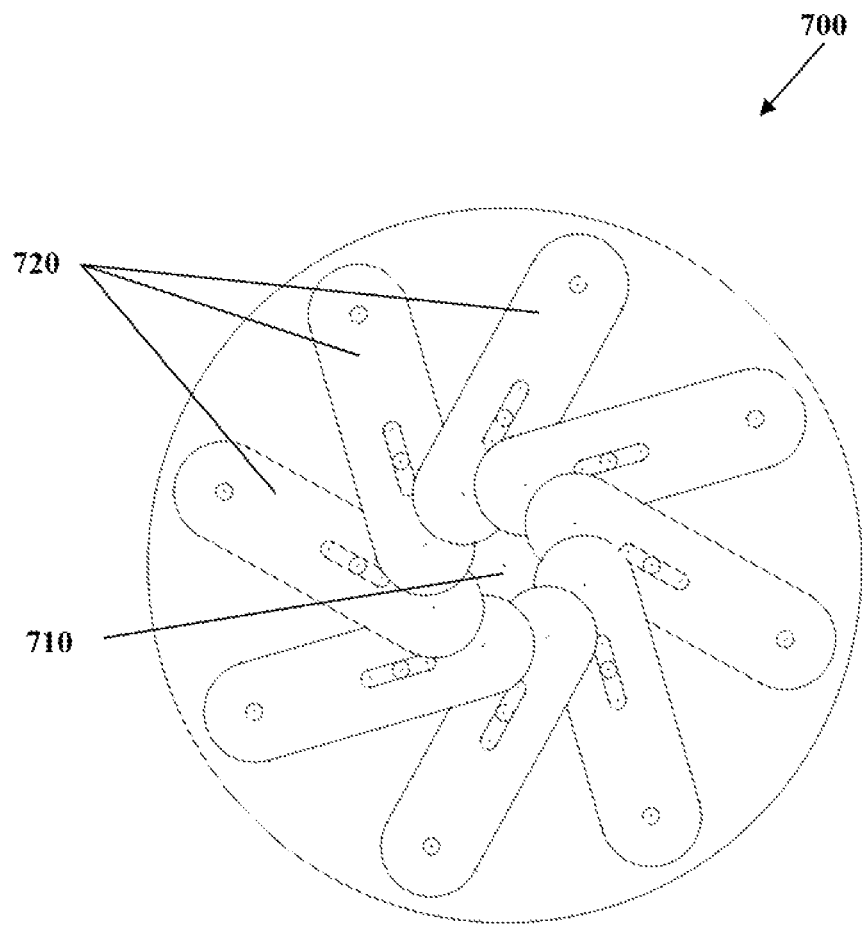
FIG. 7 illustrates a variable aperture device for operatively coupling to an output port of a mobile storage module, in accordance with some embodiments of the invention.

FIG. 7 illustrates a variable aperture device 700 operatively coupled to the output port, in accordance with some embodiments. The aperture 710 may be varied in size by pivoting of a plurality of plates 720, pivotably coupled to a main body of the variable aperture device 700. The variable aperture device 700 may comprise a series of overlapping plates 720, arranged such that they form a roughly circular aperture 710 of variable radius.

Figure 13A:
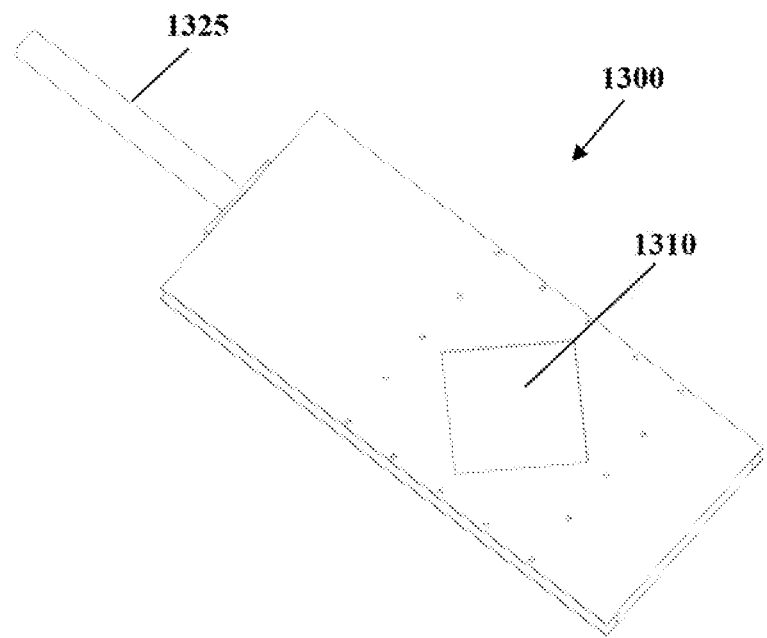
FIGS. 13A and 13B illustrate a slide gate-style variable aperture device for operatively coupling to an output port of a mobile storage module, in accordance with embodiments of the invention.
Figure 13B:
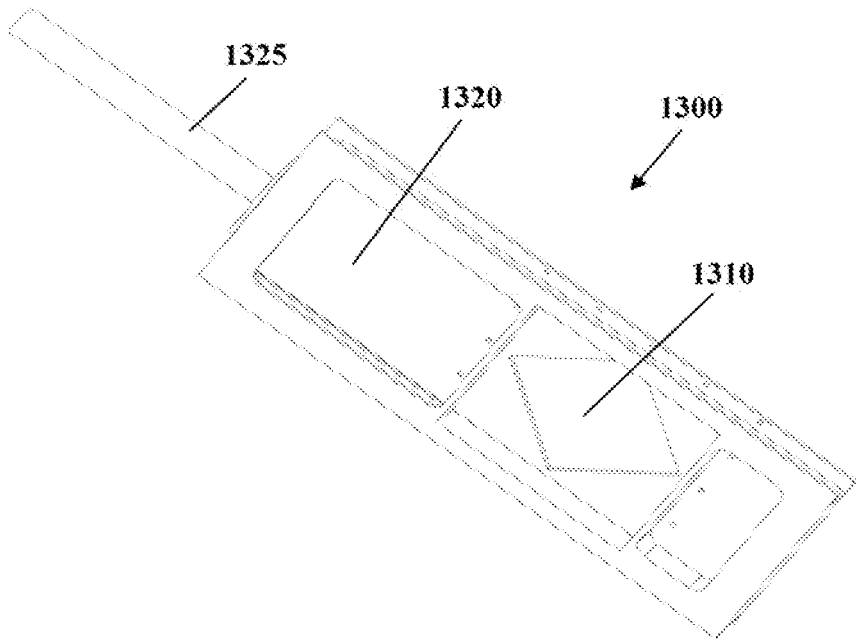

FIGS. 13A and 13B illustrate a slide gate variable aperture device 1300 for operatively coupling to the output port, in accordance with some embodiments. An aperture 1310 can be fully closed, partially opened, or fully opened, by moving a gate 1320 to block all, part, or none of the aperture 1310, respectively. An actuating arm 1325 is illustrated to assist with movement of the gate 1320.

In some embodiments, rapid isolation of proppant flow is effected by a gate comprising a reinforced flat plate sliding in channels perpendicular to the proppant flow and arranged such that full withdrawal of the plate allows substantially maximum flow and full insertion of the plate allows substantially no flow. This gate valve may be manually operated with a local mechanically-advantaged lever or remotely by way of a quick-acting hydraulic cylinder. Alternatively a butterfly valve may be used for this application.

Figure 8:
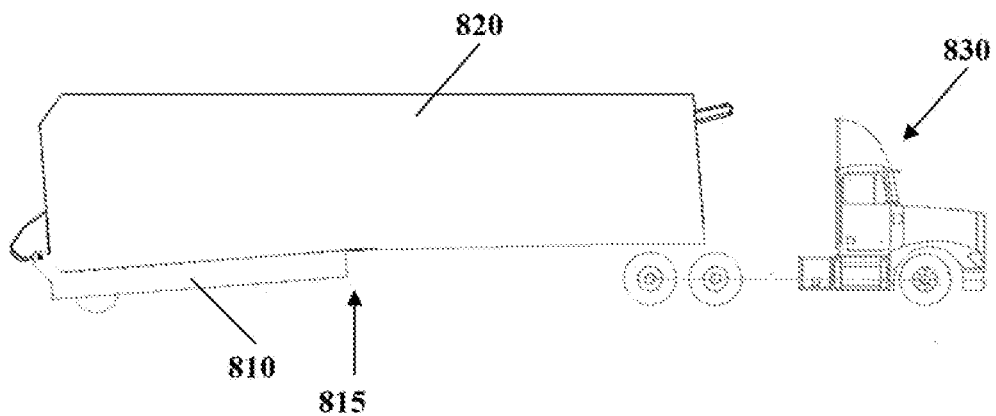
FIG. 8 illustrates a frame of a mobile storage module, in accordance with embodiments of the invention.

FIG. 8 illustrates a frame 810 of a mobile storage module, in accordance with embodiments of the present invention, which extends partway underneath the container portion 820 to an intermediate location 815. The coupler structure for coupling to the road tractor 830 may then be incorporated into the container portion 820 rather than the frame 810. This arrangement reduces weight of the mobile storage module and potentially increases allowable payload weight and/or available payload volume. In this configuration, the ground bearing envelope is reduced compared with a full-length frame, and thus additional frame surface area may be required to maintain adequately low bearing pressure. In some embodiments, the partial-length frame 810 may be configured to allow for frame adaptation to increase ground bearing area. For example, skids, deployable footings, sheeting, external supports, or the like, may be provided for this purpose.

In some embodiments, the mobile storage modules may be configured for accepting granular material from delivery vehicles other than dedicated dry-bulk proppant transporters and blowers. For example, a mobile storage module and/or in-feed elevator of or operatively coupled to the mobile storage module may be adaptable or configured for use with simple belly unloading vehicles such as grain trailers, or other locally available equipment. This may allow for substantially local infrastructure and equipment, such as associated with a local agricultural industry, to service and supply proppant, or other granular material, rather than specialized, expensive equipment sourced from a central location. This may be particularly advantageous in remote locations for operational reasons such as cost and scheduling. In some embodiments, such an in-feed elevator may be provided as part of a mobile in-feed conveyor module as described elsewhere herein.

Delivery Module

The present invention comprises one or more delivery modules, configured to receive granular material from the mobile storage modules and to convey the granular material to a predetermined delivery location. One or more powered conveyor systems may be provided on the delivery module for conveying the granular material. Conveyance of granular material may be, at various locations, at least partially assisted by gravity, unassisted by gravity, and/or conveyed against gravity.

In embodiments of the present invention, the delivery module may be reconfigurable between a transportation configuration and an operational or site configuration. In the transportation configuration, the delivery module may be configured as a standard or over-length trailer, for example subject to one or more predetermined sets of legal and/or regulatory requirements, and/or other height, length, width and/or weight restrictions. In the operational configuration, the delivery module may be configured having a granular material reception area with surface area and capacity adequate for receiving granular material from up to a predetermined number of mobile storage modules. The delivery module may be configured, in the operational configuration, to have a lower bearing surface with a predetermined portion contacting ground, adequate for supporting the weight of the delivery module and granular material thereon against ground. Conveyors may be stowed in the transportation configuration and deployed to cover or span a greater surface area in the operational configuration.

Figure 9:
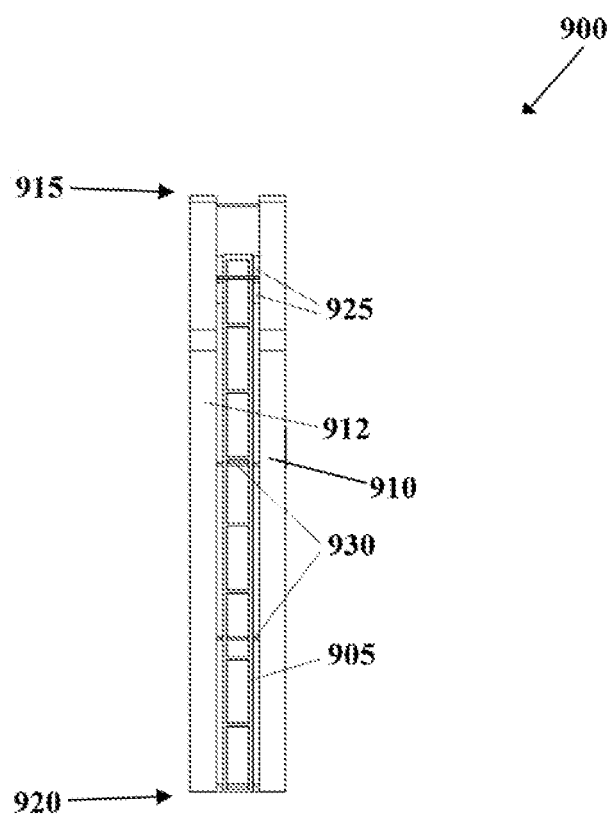
FIG. 9 illustrates a top view of a delivery module, in accordance with embodiments of the invention.

FIG. 9 illustrates a top view of a delivery module 900 in accordance with embodiments of the present invention. As illustrated, the delivery module 900 comprises a pair of main conveyors 910, 912 for receiving granular material from the mobile storage modules and conveying same to a discharge end 915. The delivery module 900 may further comprise or be operatively coupled to one or more discharge conveyors, for example conveyors 130 as illustrated in FIG. 1A and conveyors 132 as illustrated in FIG. 1B.

As illustrated in FIG. 9, the delivery module 900 comprises a trailer chassis 905 upon which two main conveyors 910, 912 are mounted. Plural main conveyors may be provided for redundancy, to facilitate continued operation or failover in case of failure of one conveyor. Alternatively, a single conveyor may be provided, which may simplify design and in some cases provide increased conveyor surface area, or more conveyors may be provided. The trailer chassis 905 may be a rock-over chassis, or other suitable frame or chassis. The delivery module may be reconfigurable between a transportation configuration and an operational or site configuration. In the operational configuration, the conveyors 910, 912 may be deployed outward relative to the transportation configuration. This configuration, in conjunction with a rock-over chassis, may facilitate deployment of the conveyors 910, 912 close to ground and outboard of the trailer chassis 905 in the operational configuration. In some embodiments, the conveyors 910, 912 may be connected to the chassis 905 via a series of laterally arranged sliding tubes spaced substantially evenly along the length of each conveyor. The sliding tubes may be deployed outward using one or more hydraulic actuators, for example. FIG. 9 also illustrates location of semi-trailer axles 925 and hydraulics 930 operatively coupled to the sliding tubes for movement thereof, thereby facilitating deployment and stowage of the conveyors 910, 912.

In some embodiments, a main conveyor of the delivery module and an associated discharge conveyor may be associated via a common conveyor belt. The common conveyor belt may extend substantially horizontally over a first predetermined area associated with the main conveyor, to be situated substantially below the output ports of one or more mobile storage modules stationed around the delivery module. The common conveyor belt may further extend at an angle over a second predetermined area associated with the discharge conveyor, to raise the granular material to a predetermined height for discharge. In this manner, granular material, such as proppant, may be conveyed from output ports of the mobile storage modules and elevated to a height suitable for discharge into vehicular, or otherwise, mounted receptacles, such as blender modules.

In some embodiments, such as illustrated in FIG. 9, the delivery module conveyors 910, 912 may be carried upon a dedicated, custom configured semi-trailer chassis 905. The chassis 905 may comprise a full-length rigid frame having, at a first end 920, a standard trailer kingpin and coupler structure, or other trailer coupling components, and at a second, discharge end 915 a set of one or more axles and/or suspension assembly of the semi-trailer. As mentioned previously, the chassis 905 may be a rock-over chassis. When disconnected from the road tractor, the first end 920 of the rock-over chassis may be lowered to ground, and the chassis lower surface may contact the ground, thereby evenly distributing load of the delivery module into the ground along the length of the rock-over chassis. In some embodiments, a suspension assembly may be located and oriented such that by deflating air springs thereof, the chassis 905 can be lowered into contact with the ground to form a full length bearing structure.

Figure 10:
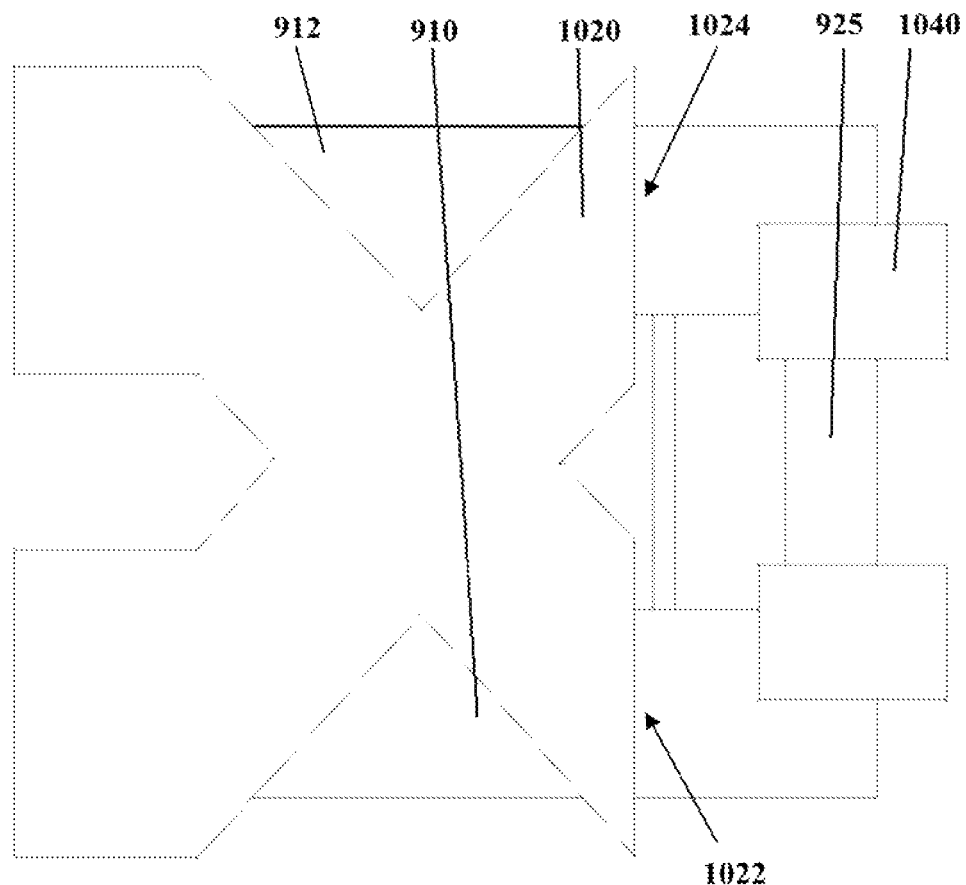
FIG. 10 illustrates an end view of a delivery module, in accordance with embodiments of the invention.

FIG. 10 illustrates an end view of a discharge end of a delivery module, in accordance with embodiments of the present invention. As illustrated, the discharge ends of a pair of conveyors 910, 912 of the delivery module may be connected by a discharge manifold 1020 extending downwards and equipped with two discharge ports 1022, 1024. The discharge manifold receives granular material from both left and right conveyors 910, 912 and selectably provides the granular material to one or both of the two discharge ports 1022, 1024. The manifold 1020 may comprise a configurable multiple orientation gate or other means for directing granular material from a selected one, or both of the conveyors 910, 912 to a selected one, or both of the two discharge ports 1022, 1024. The manifold may thereby be configured to provide flow from one or more selected conveyors to one or more selected discharge ports, and/or to blend flow from each conveyor to a selected discharge port or both discharge ports. In some embodiments, the proportions and amounts of material provided to each discharge port and/or from each conveyor may be adjusted, thereby facilitating finer control of mixing. FIG. 10 further illustrates chassis 925 and wheels 1040 of the delivery module.

Figure 11:
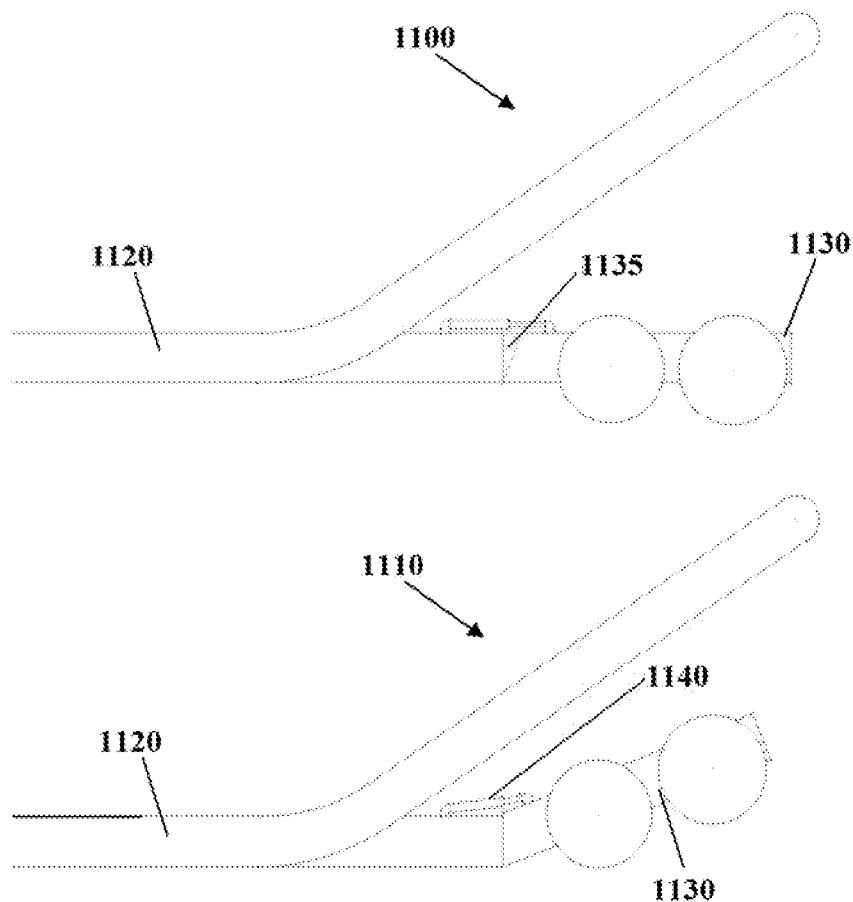
FIG. 11 illustrates a discharge end of a delivery module in both transportation and operational configurations, in accordance with embodiments of the invention.

FIG. 11 illustrates a rear/discharge end of a delivery module in both a transportation configuration 1100 and an operational configuration 1110, in accordance with embodiments of the present invention. The chassis 1120 may be pivotably coupled with a wheeled portion 1130 containing the rear axles and wheels of the delivery module semi-trailer, for example via a pin joint or other pivotable coupling. In the transportation configuration, the wheeled portion 1130 may be lowered to engage ground, for example by actuation of one or more hydraulic cylinders 1140, the chassis 1120 lifted off of ground during transport. A removable brace 1135 may be installed in a substantially triangular gap between the chassis 1120 and the wheeled portion 1130 for improved support during transport. In the operational configuration, the brace 1125 may be removed and the wheeled portion 1130 raised, for example by actuation of the one or more hydraulic cylinders 1140, and the chassis lowered to engage ground. This configuration facilitates tilting retraction of the axles for the operational configuration, thereby facilitating engagement of the chassis 1120 with the ground for load distribution. Tilting and retraction of axles may also be provided for in one or more mobile storage modules, for facilitating engagement of the frame thereof with ground to facilitate load distribution.

In some embodiments, the present invention may be configured to facilitate prevention of proppant loss, for example due to loss of proppant from conveyors or due to overflow in event of conveyor failure. For example, embodiments of the present invention comprise one or more covers, such as non-rigid covers or tarps, which may be deployed to enclose regions through which granular material is conveyed. For example, each main conveyor and/or discharge conveyor of the delivery module may be fully or partially enclosed by a cover over its length. The conveyor cover may comprise apertures at predetermined locations for receiving material from the output ports and/or discharge chutes of the mobile storage modules. One or more covers, such as fitted non-rigid cowls may be provided between the apertures of the conveyor cover and the output ports, with approximate seal at cover interfaces. In this manner, environmental contamination, such as rain or snow, may be restricted from entering the granular material as it is delivered from the mobile storage modules.

In embodiments, the delivery module may be powered via an on-board hydraulic power pack, a hydraulic power pack of a mobile support unit module operatively coupled thereto, or a combination thereof.

Mobile Support Unit Module

The present invention further comprises one or more mobile support unit modules. A mobile support unit module may be configured as a remotely-controlled, self-propelled vehicle which is capable of connecting to and providing power to other modules of the system. In some embodiments, substantially all components of the system, such as the delivery modules and mobile storage modules, are powered by the one or more mobile support unit modules. In some embodiments, at least some components of the system are powered by the one or more mobile support unit modules.

In embodiments, the mobile support unit module comprises a hydraulic power pack which is configured for coupling to one or more other modules as needed to provide a source of hydraulic power. In some embodiments, the mobile support unit module may comprise plural hydraulic power packs. The hydraulic power pack may be used for deployment and operation of the modules in receipt of same. For example, the hydraulic power pack may be used for operating the system conveyors, raising and lowering the mobile storage modules, operating the discharge aperture, opening and closing input ports or filling hatches, and the like. The hydraulic power pack may be operatively coupled to a system of transmission lines, such as hydraulic hoses, carried aboard the mobile support unit module. Mating hydraulic connectors may be provided on the mobile support unit module as well as on other modules configured to receive hydraulic power.

In embodiments, the mobile support unit module may be configured to operate as a towing vehicle. The mobile support unit module may, for example, be configured to tow delivery modules and mobile storage modules, or other mobile equipment, into place during deployment, re-orientation, and teardown. The mobile support unit module may be configured as a four-wheel drive vehicle, track drive, or other vehicle having sufficient towing capacity and traction for a given environment. In some embodiments, plural mobile support unit modules may be coupled in series or in parallel for additional towing capacity.

In embodiments, the mobile support unit module is configured to provide heating. Heating may be used to warm engines of various equipment, such as pumping equipment. Heating may be provided, for example, via a fluid (for example water, air or oil) which is heated in the mobile support unit module and circulated to equipment requiring heating. Heating may be provided via other means, such as electricity, conduction, or the like.

In some embodiments, the hydraulic power may be used to provide heating. For example, the hydraulic power pack may be operatively coupled to a hydraulically powered fluid heater, such as a water heater, water shear, or other fluid heater. The fluid heater may be located aboard the mobile support unit module. Alternatively, the fluid heater may be located aboard the equipment to be heated, thereby mitigating potential heat loss during hot fluid transfer. The fluid heater may be fitted to equipment such as oilfield equipment. In some embodiments, the fluid heater may act as an engine block heater, for example by circulating warmed glycol or other fluid around an engine in a closed loop. For example, the hydraulic power pack may drive a water heater, the hot water in turn heating the warmed glycol circulating around the engine and/or other equipment to be heated.

In some embodiments, the mobile support unit module may, by providing hydraulic power, heating, and the like, facilitate operation of a frac pumper or similar oilfield equipment operating in cold environmental conditions, independent of the oilfield equipment's towing vehicle long-haul towing vehicle.

In embodiments, the mobile support unit module is configured to provide starting power. For example, for mobile pumpers or other combustion engine driven equipment. Starting power may be provided as electrical power, mechanical power, hydraulic power, or the like, or a combination thereof.

In some embodiments, more mobile support unit modules are provided than are required for system operation. Thus, at least some excess power capability or redundancy is present within the system.

The mobile support unit modules may be configured to fit in a container such as a box-type or vehicle carrier semi-trailer for transportation. Plural mobile support unit modules may be configured to fit within the same container. In some embodiments, the mobile power units may be partially disassembled or components may be folded down, or the like, to facilitate stowage into the container.

In some embodiments, each mobile support unit module comprises a chassis, an engine, a transmission system, a control system, and a hydraulic power pack. The chassis, engine and transmission system are configured to provide a vehicle with adequate towing capacity in off-road conditions, as would be readily understood by a worker skilled in the art. The control system comprises steering, acceleration and braking, and hydraulic power pack control. The control system is operatively coupled to a radiofrequency (RF) interface by which the mobile support unit module may be controlled by a remote operator, and by which telemetry information such as visual information and system status may be provided to the remote operator, as would be readily understood by a worker skilled in the art. The RF interface may comprise a remote operator interface, a remote RF transceiver, an on-board RF transceiver, and a mobile support unit module interface.

The remote operator interface may be implemented in hardware, software, or both. The remote operator interface may, for example, comprise input devices such as joysticks, touchscreens, touchpads, keyboards, buttons, mice, physical gestures, or the like, by which an operator can input commands in a predetermined manner. The remote operator interface is configured to encode the commands for transmission by the remote RF transceiver, which is operatively coupled to the remote operator interface. The remote RF transceiver may be further configured to receive telemetry information from the on-board RF transceiver, which is then provided to the remote operator interface for presentation to the operator, for example via annunciators, video screens, audio speakers, tactile output means, or the like, or a combination thereof.

The remote RF transceiver, which is typically located with or near the remote operator interface, and the on-board RF transceiver, which is typically located on board the mobile support unit module, are configured for radio communication with each other. Radio communication may comprise conveying digital and/or analog data via RF signal modulation in accordance with one of a variety of protocols as would be readily understood by a worker skilled in the art. For example, data may be conveyed via one or more of: amplitude modulation, frequency modulation, frequency shift keying, phase shift keying, direct sequence spread spectrum protocols, frequency hopping protocols, multiple access communication, Wi-Fi™ signals, or the like. Radio frequencies used for communication may fall within unlicensed spectrum (such as ISM bands) or licensed spectrum. Commands and data may be encoded in accordance with a predetermined protocol. For example, binary codewords associated with a predetermined dictionary of commands may be exchanged between transceivers.

The on-board RF transceiver is configured to interface with a mobile support unit module interface, for example by forwarding commands to the mobile support unit module interface and receiving data from the mobile support unit module interface for transmission to the remote RF transceiver. The mobile support unit module interface may comprise a microprocessor or microcontroller, operatively coupled to various electrical and/or mechanical components of the mobile support unit module and/or control system. Operative coupling may be via solenoids, optical couplings, electronic circuits, electromechanical interfaces, and the like.

The mobile support unit module and other modules of the system may further be configured to communicate with each other, for example via a wired or wireless link. The various modules may comprise inter-module communication systems, comprising communication and processing electronics configured for this purpose. Thus, for example, the mobile support unit module may be configured to query and determine the location and operational status of other modules of the system. Operational status may include, for example, whether another module is currently in a transportation or operational configuration, whether the module requires starting power, heat, or hydraulic power, or the like. Location may be determined at a distance by providing various modules with electronic beacons, such as radio or infra-red beacons, or by using machine vision systems. The mobile support unit module may search for and discover beacons or predetermined visual patterns, and home in on them in order to reach a desired module and service same. The inter-module communication system may be configured to facilitate wireless communication, similarly to wireless communication between the remote RF transceiver and on-board RF transceiver.

In some embodiments, the control system may provide for autonomous or semi-autonomous control of the mobile support unit module. The remote operator may issue a command to the mobile support unit module, which then autonomously executes a sequence of operations in order to execute one or more predetermined tasks associated with the command. Such tasks may include tasks associated with setting up, reconfiguring or tearing down one or more modules of the system, operating the system, connecting with and providing hydraulic power to a predetermined module of the system, connecting to a predetermined module, towing a predetermined module, or the like, or a combination thereof.

For example, a mobile support unit module may be configured to autonomously move toward a mobile storage module arranged in a transportation configuration, wherein the movement is assisted by a beacon or machine vision. The mobile support unit module may then autonomously connect its hydraulic power pack to a hydraulic port of the mobile storage module. The mobile storage module, upon detecting that hydraulic power is available, may self-deploy. Various other autonomous operations may also be performed. Semi-autonomous operations may comprise a series of autonomous sub-operations, separated by intervals at which an operator inspects the situation, adjusts operation if necessary, and initiates the next autonomous sub-operation in the series.

In some embodiments, the mobile support unit module may be operable via manual remote control. A remote operator receives telemetry data such as on-board camera feeds, speed and location information, and the like, and inputs appropriate commands to operate the mobile support unit module.

In embodiments of the present invention, the mobile support unit module and/or a remote control module is configured to facilitate automatic control of one more functionalities of one or more other modules, such as delivery modules, mobile storage modules, in-feed conveyor modules, and possibly even other mobile support unit modules. The mobile support unit module and/or the remote control module may comprise a computer, programmable logic controller, or the like, configured to generate and provide control signals for facilitating such automatic control. The computer, programmable logic controller, or the like, may further be configured to receive telemetry signals from said modules for facilitating status monitoring, feedback control loops, or the like.

The control signals and telemetry signals may be exchanged between the mobile support unit modules and/or remote control module and the other modules via the inter-module communication system. Thus, for example, the mobile support unit module may generate control signals which are wirelessly transmitted to another selected module, received by a corresponding wireless transceiver of the selected module, and converted to signals useful for remote control of the selected module.

In some embodiments, the control signals are generated automatically by the mobile support unit module and/or the remote control module, thereby facilitating automatic (autonomous) or semi-automatic (semi-autonomous) control. In some embodiments, the control signals are generated in response to local or remote operator input, thereby facilitating manual remote control and some aspects of semi-autonomous control.

In embodiments, one or more of the following functionalities may be controlled by the mobile support unit module and/or the remote control module via the above-described configuration: the rate at which granular material fills a mobile storage module; opening and closing the input port or filling hatch of a mobile storage unit; the rate at which granular material is discharged from a mobile storage module; and the rate at which material is provided by the delivery module. Other functionalities may also be controlled. For example, various motors, actuators, fans, blowers, engines, solenoids, relays, sensors, annunciators, lockouts, and the like, may be controlled individually or in a coordinated manner by the mobile support unit module. The mobile support unit module may further control functionalities of plural modules in a coordinated manner.

In some embodiments, functionalities as described above as well as other functionalities may be controlled by controlling the operation of one module or a combination of modules. For example, controlling the rate at which granular material fills a mobile storage module may comprise controlling the conveyor speed of a mobile in-feed conveyor module operatively coupled to the mobile storage module, and possibly controlling the mobile storage module to ensure its input port is open. Controlling the rate at which granular material is discharged from a mobile storage module may comprise controlling the variable aperture size at the mobile storage module output port, and possibly controlling the conveyor speed of the delivery module receiving the granular material. Controlling the rate at which material is provided by the delivery module may comprise controlling both the conveyor speed of the delivery module and the rate at which granular material is discharged from each of the mobile storage modules providing material to the delivery module.

In some embodiments, the system may be controlled, for example via the mobile support unit module and/or via the remote control module, so as to provide a desired blend of various types of granular materials, such as various proppant types, as output of one or more delivery modules. For example, two or more different mobile storage modules may be provided with two or more different granular materials or two or more different blends of granular materials. By controlling the variable aperture size of the different mobile storage modules, a desired blend of different granular materials may be provided to the delivery module and conveyed thereby. In some embodiments, the blend of different granular materials may be subsequently mixed to provide for a substantial uniform consistency of the blend.

In some embodiments, the output ports of plural mobile storage modules may be controlled, for example via the mobile support unit module and/or the remote control module, in a coordinated manner. For example, the variable discharge apertures or gates at the output ports of different mobile storage modules feeding a common delivery module may be opened and closed in sequence, such that granular material is substantially continuously provided to the delivery module as each of the mobile storage modules are emptied. For example, the aperture of a first mobile storage module may be opened to feed the delivery module then closed as the mobile storage module is emptied, while concurrently the aperture of a second mobile storage module may be opened to take over providing of the granular material.

In some embodiments, one or more mobile in-feed conveyor modules may be controlled, for example via the mobile support unit module and/or the remote control module, so as to sequentially fill different mobile storage modules. The overall storage capacity of the mobile storage modules may thereby be managed as they are emptied of granular material. In some embodiments, controlling a mobile in-feed conveyor module may generally comprise causing the mobile in-feed conveyor module to move, under its own power, to a desired mobile storage module, deploy to its operational configuration, and begin feeding the mobile storage module with a supply of granular material.

In some embodiments, sequential filling of the mobile storage modules may be controlled, for example via the mobile support unit module and/or the remote control module, in coordination with sequential discharge of the mobile storage modules. For example, the mobile storage module may be controlled such that the mobile storage modules are emptied of granular material at different times, and the different times are spaced apart sufficiently that the emptied mobile storage modules may be re-filled by the set of available in-feed conveyors, such that the waiting times for re-filling of mobile storage modules is minimized or eliminated, or at least such that a continuous supply of granular material may be delivered via the delivery modules.

In some embodiments, control signals provided to the various system modules, for example via the mobile support unit module and/or the remote control module, may be derived from manual input command or from pre-set parameter control.

In some embodiments, the various modules may provide feedback signals useful for adjusting subsequent control signals. Such feedback signals may include one or more of: feedback indicative of storage module container portion contents by weight (for example provided by a load cell contained within the storage module rear hinge pin), feedback indicative of delivery module and/or in-feed conveyor module conveyor speed, feedback indicative of open/closed status and/or aperture size of output ports, discharge apertures, input ports, and the like.

As described above, in some embodiments the mobile support unit module and/or the remote control module, or a set of mobile support unit modules and/or remote control modules, may operate to control the system as a whole, either autonomously, semi-autonomously, or by relaying remote operator commands. Various operations, such as deployment operations, teardown operations, granular material delivery operations, adjustment of granular material mix, and the like, may be executed via such control.

Figure 14:
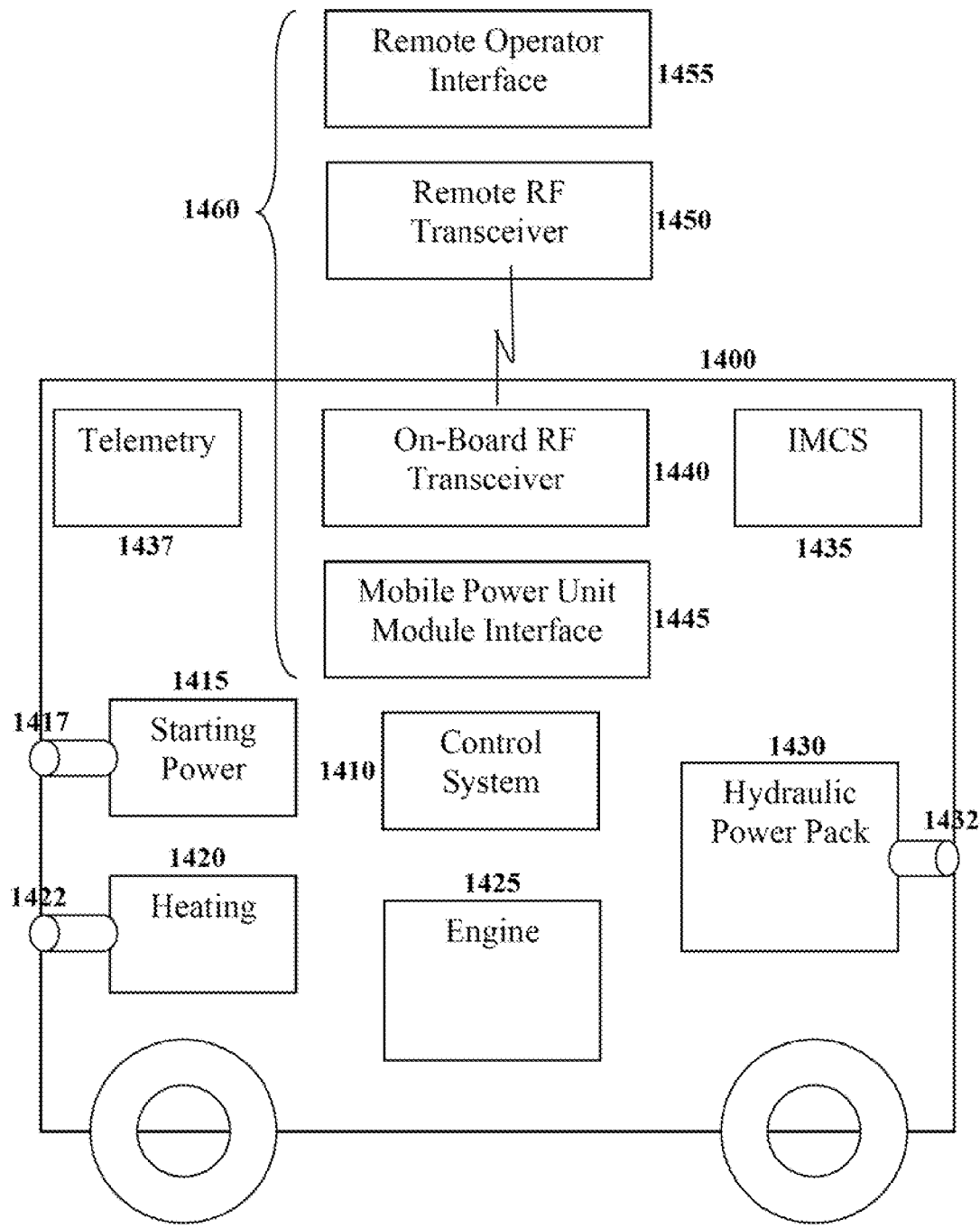
FIG. 14 illustrates a block diagram of a mobile support unit module in accordance with an embodiment of the present invention.

FIG. 14 illustrates a block diagram of a mobile support unit module 1400 and associated systems, in accordance with an embodiment of the present invention. The mobile support unit module 1400 comprises a control system 1410, a starting power system 1415, a power port 1417 for conveying the starting power to another module when operatively coupled thereto, a heating system 1420, a heating power 1422 for conveying the heat to another module when operatively coupled thereto, an engine 1425 for providing power and mobility, a hydraulic power pack 1430, and a hydraulic power port 1432 for conveying the hydraulic power to another module when operatively coupled thereto. The mobile support unit module 1400 further comprises an inter-module communication system 1435 for detecting, communicating with and/or controlling other modules of the system. The mobile support unit module 1400 further comprises a telemetry system 1437, for gathering telemetry data such as camera images, module and system status information, and the like. The mobile support unit module 1400 further comprises the following components of an RF interface 1460: a mobile support unit module interface 1445 and an on-board RF transceiver 1440. The RF interface 1460 further comprises a remote RF transceiver 1450 in radio communication with the on-board RF transceiver 1440, and a remote operator interface 1455. The various illustrated components are operatively interconnected and function substantially as described above.

Remote Control Module

As described above, the mobile support unit module may provide control signals to one or more other modules and/or components of the system. The mobile support unit module may in turn be controlled via an RF interface, comprising a remote RF transceiver and a remote operator interface. The RF interface (including a remote operator interface) and the mobile support unit may thus function as an embodiment of a remote control module, configured for remote control (for example manual, automatic or semi-automatic control) of the system.

Additionally or alternatively, remote control of modules and/or components of the system may be provided for via a different remote control module configuration. For example, the above-described control functionality provided by the mobile support unit module may be located aboard a different module or co-located with the remote operator interface and remote RF transceiver. Thus, the remote control module may comprise an operator-held unit which transmits radiofrequency control signals to various other RF transceivers in the system. The operator-held unit may thus comprise a computer, programmable logic controller, inter-module communication system, and the like as described above, to thereby facilitate remote control of the system without necessarily routing control signals through a mobile support unit module.

In some embodiments, various modules of the system may be fitted with RF signal relays, such that control signals may be forwarded by the signal relays. In some embodiments, one or more modules such as mobile storage modules or a delivery module may comprise the components related to control functionality of the mobile support module as described above. Thus, for example, a delivery module or mobile storage module may comprise the computer or programmable logic controller, inter-module communication system, and on-board RF transceiver previously described as being housed aboard the mobile support module. The control functionality may thus be unchanged, although the control signals originate from or are routed through a different location.

In-Feed Conveyor Module

Embodiments of the present invention comprise one or more mobile in-feed conveyor modules, configured for conveying granular material from a material source to a selected mobile storage module.

In some embodiments, a mobile in-feed conveyor module is configured as a remotely-controlled, self-propelled vehicle which is optionally capable of connecting to and providing power to other modules of the system. In some embodiments, substantially all components of the system, such as the delivery modules and mobile storage modules, are powered by the one or more mobile in-feed conveyor modules. In some embodiments, at least some components of the system are powered by the one or more mobile in-feed conveyor modules. In some embodiments, modules of the system are powered at least in part by a combination of in-feed conveyor modules and mobile support unit modules.

In some embodiments, at least one mobile in-feed conveyor module is configured to also operate as a mobile support unit module as described elsewhere herein. Thus, an in-feed conveyor module may also be capable of providing control signals, hydraulic power, heating, towing capacity, and the like.

In some embodiments, regardless of whether or not other functionality is provided, the primary purpose of an in-feed conveyor module is to provide a mobile platform for an in-feed conveyor or elevator operatively coupled thereto. The mobile in-feed conveyor module may be remotely or locally, and manually or automatically operated to position the conveyor or elevator appropriately. Positioning of the conveyor or elevator may be such that granular material such as proppant is conveyed directly or indirectly from some source at approximately ground height to the height of a selected mobile storage unit input port when the mobile storage unit is in the raised operational configuration. The source of granular material may be some method of road transport vehicle, a container thereof, a silo, an uncontained source of granular material, or the like.

Figure 15:
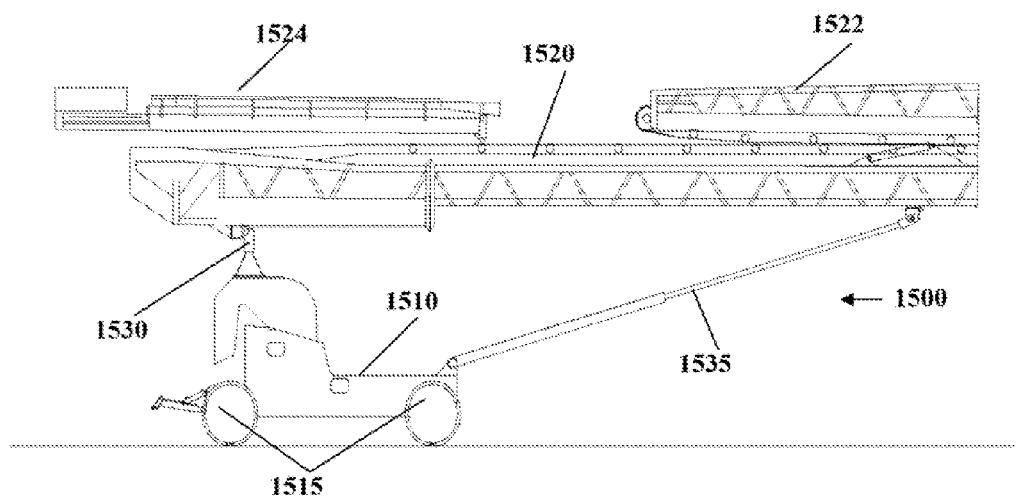
FIG. 15 illustrates an in-feed conveyor module arranged in a transportation configuration, in accordance with embodiments of the present invention.

FIG. 15 illustrates an in-feed conveyor module 1500 arranged in a transportation configuration, in accordance with embodiments of the present invention. The in-feed conveyor module 1500 comprises a chassis 1510, wheels 1515, which may be motor-driven at one axle or multiple axles, and an in-feed conveyor 1520, which is deployable in the operational configuration to convey granular material from substantially ground level to the input port of a mobile storage module. The in-feed conveyor 1520 further comprises foldable sections 1522 and 1524, which are foldable and deployable via mechanical actuators (not shown). Folding of the sections 1522 and 1524 may facilitate stowage of the module 1500 and may also improve maneuverability when the module 1500 is controllably maneuvered around the work site under its own power. The in-feed conveyor module 1500 further comprises an engine, a transmission system, a control system, and a radio transceiver system, similarly to those of the mobile support unit module described herein. The in-feed conveyor module may further comprise components such as an inter-module communication system, hydraulic power pack, heating system, starting power system, and the like.

Figure 16:
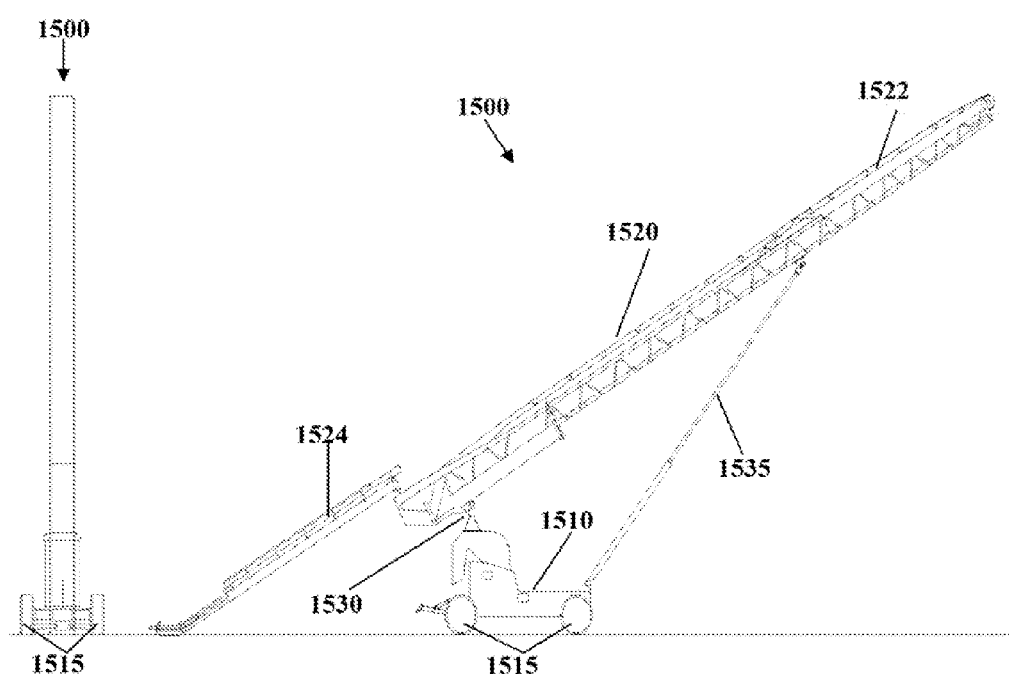
FIG. 16 illustrates the in-feed conveyor module of FIG. 15, arranged in an operational configuration, in accordance with embodiments of the present invention.

The in-feed conveyor module 1500 further comprises a pivot mount 1530 and a hydraulic actuator 1535, which are together configured to pivot the in-feed conveyor 1520 between its transportation configuration as shown in FIG. 15 and its operational configuration as shown in FIG. 16.

FIG. 16 illustrates the in-feed conveyor module 1500 of FIG. 15, arranged in an operational configuration, in accordance with embodiments of the present invention. The module is illustrated in both a side view and an end view.

Set-Up, Operation and Tear-Down

Embodiments of the present invention are reconfigurable between transportation and operational configurations, thereby facilitating mobility, and relatively quick set-up and tear-down when compared with at least some prior art solutions. Each mobile storage module and delivery module may be hauled to a work site by a separate truck, for example. Embodiments of the present invention provide for a self-erecting, and substantially self-sufficient, system for storage and handling of proppant or other granular material. In some embodiments, the system may be set up on site within hours.

In some embodiments, the present invention may provide for storage and delivery capacity of suitable for projects requiring about 50,000 cubic feet of granular material such as proppant. For example, the system may comprise plural mobile storage modules, each configured for holding up to 5,000 cubic feet of granular material, which may be discharged by gravity to a delivery module. Ten mobile storage modules so configured may thus provide about 50,000 cubic feet of granular material. The rate at which granular material may be supplied may also scale with the number of mobile storage modules used, subject to capacity of the distribution module arrangement in use. More or fewer mobile storage modules may also be provided, thereby making the system scalable as required by an operation. Each delivery module may be capable of servicing up to a predetermined number of mobile storage modules. Thus, in some embodiments, plural delivery modules may be provided, end-to-end or in parallel, to satisfy operational requirements. One, two or more mobile support unit modules may be provided, depending on operating requirements.

In embodiments of the present invention, one or more modules, such as mobile storage modules and delivery modules, may be powered by self-contained hydraulic power packs, or other appropriate sources of fluid or mechanical power. Each module may be powered by its own power pack, with power packs being interchangeable between modules in case of failure events. Plural modules may be powered by a single power pack of adequate capacity. Each power pack may comprise a prime mover, such as a combustion engine, a hydraulic pump, a hydraulic reservoir and associated filtering, plumbing and control valves, and possibly other components configured together for supplying hydraulic power. In some configurations, plural modules can operate independently, but the hydraulic power packs may be configured to allow cross connection between modules or to auxiliary equipment as may be required. In some embodiments, each module having its own power pack may be operable independently. This reduces requirements for external lifting equipment or power sources, which may not be readily available on site. As described above, power packs may additionally or alternatively be provided aboard mobile support unit modules. In some embodiments, mobile support unit modules may be used for substantially all power needs, thereby eliminating the need for on-board power packs, although on-board power packs or spare power packs not mounted on a mobile support unit module vehicle may be provided, for example for backup purposes.

Figure 12:
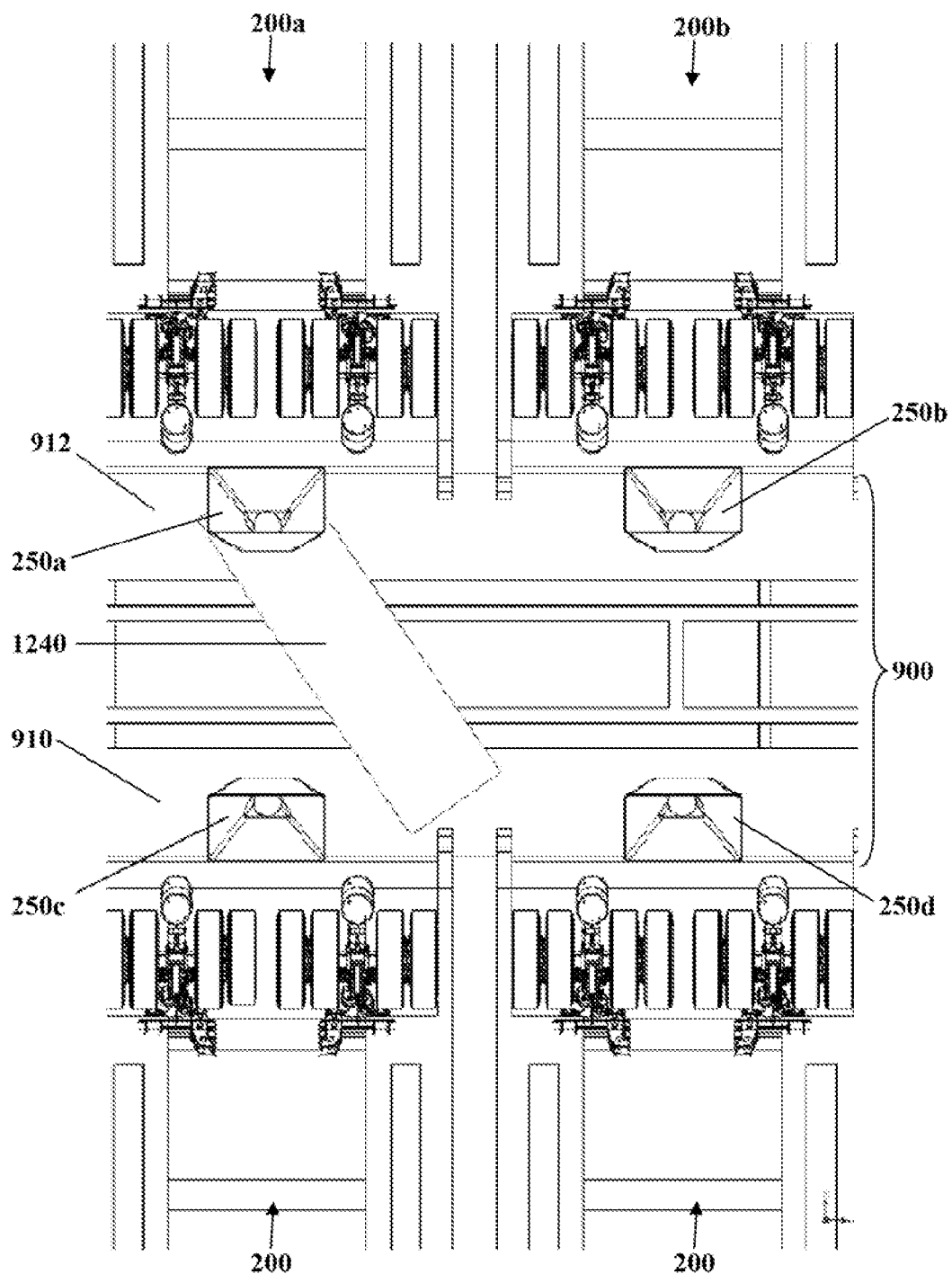
FIG. 12 illustrates a partial top view of a system for handling granular material, in accordance with embodiments of the invention.

FIG. 12 illustrates a partial top view of a system for handling granular material in accordance with the present invention. The system comprises a plurality of mobile storage modules 200*a*, 200*b*, 200*c*, 200*d* arranged around a delivery module 900. Each mobile storage module 200*a*, 200*b*, 200*c*, 200*d* comprises a discharge chute 250*a*, 250*b*, 250*c*, 250*d*, respectively. A first pair of discharge chutes 250*a*, 250*b* are positioned overtop of a first conveyor 912 of the delivery module, and a second pair of discharge chutes 250*c*, 250*d* are positioned overtop of a second conveyor 910 of the delivery module. During normal operation, the first pair of discharge chutes 250*a*, 250*b* discharge granular material onto the first conveyor 912, and the second pair of discharge chutes 250*c*, 250*d* discharge granular material onto the second conveyor 910. Granular material is then conveyed to a discharge end of the delivery module. A crossover conveyor 1240 may be provided as shown should the first conveyor 912 fail. The crossover conveyor 1240 may have a first end which may be oriented under the discharge chute 250*a* or another chute, and a second end overtop of the second conveyor. The crossover conveyor 1240 may thus be configured to convey material from the discharge chute 250*a* to the second conveyor 910, thereby bypassing the first conveyor 912 in the event of failure thereof. One or more crossover conveyors may be provided which may be oriented and/or re-oriented as needed between a selected discharge chute and a selected conveyor.

Uses

Embodiments of the present invention may be used for storing and delivering proppant for drilling by hydraulic fracturing, for example for oil and gas drilling, shale drilling, and the like. In accordance with some embodiments, the present invention may be configured to convey the proppant material, via the delivery module, to one or more blender modules. The blender modules may receive and combine the proppant with water and possibly other chemicals to create slurry which is then provided to one or more hydraulic fracturing pumps for pumping into a well borehole for drilling.

In some embodiments, the present invention may be employed as a material storage and metering device for granular or flow-able materials other than proppant, and/or in applications other than well stimulation. For example, embodiments of the present invention may be employed to receive, store and convey a predetermined granular material in applications such as agriculture, in construction, road sanding and salting, and the like. In some embodiments, the present invention may be configured for water recovery storage for slick water fracking operations.

Additional Embodiments

Embodiments of the present technology provide a delivery module for handling granular material, the delivery module configured, in a delivery module operational configuration, to receive said granular material from one or more mobile storage modules and to convey said granular material to a predetermined delivery location, the one or more mobile storage modules adjacent to the delivery module, each of the one or more mobile storage modules configured, in a mobile storage module operational configuration, to hold and dispense said granular material downward to the delivery module.

Embodiments of the present technology provide a mobile storage module for handling granular material, the mobile storage module configured, in a mobile storage module operational configuration, to hold and dispense said granular material downward to an adjacent delivery module, the delivery module configured, in a delivery module operational configuration, to receive said granular material from the mobile storage module and to convey said granular material to a predetermined delivery location.

In some embodiments, the mobile storage module is reconfigurable between said mobile storage module operational configuration and a mobile storage module transportation configuration, the mobile storage module towable as a trailer in the mobile storage module transportation configuration.

In some embodiments, the mobile storage module comprises: a frame; a container portion supported by the frame and pivotably coupled thereto, the container portion configured to store said granular material and comprising an input port for receiving said granular material and an output port for dispensing said granular material; and an actuating system configured to pivot the container between a lowered position and a raised position, wherein, in the raised position, the input is located above the output. In some embodiments, the mobile storage module comprises or is operatively coupled to a loading system configured to convey said granular material thereto.

In some embodiments, the mobile storage module comprises a chassis, the chassis reconfigurable between a semi-trailer chassis for transportation and a bearing surface for support against ground during operation. In some embodiments, the chassis is a rock-over chassis. In some embodiments, the chassis comprises a wheeled portion movable relative to a bearing surface portion between a first position and a second position, the wheeled portion configured to engage ground in the first position for transportation, the wheeled portion configured to retract from ground in the second position to facilitate engagement of ground by the bearing surface portion.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A system for handling granular material, the system comprising:
   a. a delivery module configured, in a delivery module operational configuration, to receive said granular material and to convey said granular material to a predetermined delivery location;
   b. a plurality of mobile storage modules adjacent to the delivery module, each of the plurality of mobile storage modules configured, in a mobile storage module operational configuration, to hold and dispense said granular material downward to the delivery module at a non-vertical orientation; and
   a remotely controllable, self-propelled mobile support unit module configured to provide power and control signals to one or more of the delivery module and the plurality of mobile storage modules, the control signals automatically or semi-automatically generated by a remote control module integrated with or operatively coupled to the mobile support unit module, the mobile support unit module further comprising an engine and a transmission system and configured for towing one or more of the delivery module and the plurality of mobile storage modules.

2. The system of claim 1, wherein the remote control module is configured to facilitate automatically coordinated control of plural portions of the system.

3. The system of claim 1, wherein the mobile support unit module comprises a hydraulic power pack configured to provide said power.

4. The system of claim 1, wherein the mobile support unit module comprises a radiofrequency interface configured to facilitate remote control of the mobile support unit module.

5. The system of claim 1, wherein the mobile support unit module is configured to operate as a source of heat for heating other equipment, equipment engines, materials handled by the system, working fluids, or a combination thereof.

6. The system of claim 1, wherein the mobile support unit module is configured to operate as a source of starting power for the one or more other system components.

7. The system of claim 1, wherein each of the plurality of storage modules are reconfigurable between said mobile storage module operational configuration and a mobile storage module transportation configuration, the mobile storage modules towable as separately transportable trailers in the mobile storage module transportation configuration.

8. The system of claim 1, wherein each of the plurality of mobile storage modules comprises:
   a. a frame;
   b. a container portion supported by the frame and pivotably coupled thereto, the container portion configured to store said granular material and comprising an input port for receiving said granular material and an output port for dispensing said granular material; and
   c. an actuating system configured to pivot the container portion between a lowered position and a raised position, wherein, in the raised position, the input port is located above the output port.

9. The system of claim 1, wherein each of the plurality of mobile storage modules further comprises a loading system configured to convey said granular material thereto.

10. The system of claim 1, wherein the delivery module is reconfigurable between said delivery module operational configuration and a delivery module transportation configuration, the delivery module towable as a separately transportable trailer in the delivery module transportation configuration.

11. The system of claim 1, wherein the delivery module comprises two or more powered conveyor systems and a crossover conveyor system, the crossover conveyor system configurable to bypass one of the two or more powered conveyor systems.

12. The system of claim 1, wherein at least one mobile storage module is stationed along one side of the delivery module, and at least another mobile storage module is stationed along an opposing side of the delivery module in the mobile storage module operational configuration.

13. The system of claim 1, wherein one or more mobile storage modules comprise interchangeable components.

14. The system of claim 1, wherein at least one of the delivery module and the plurality of mobile storage modules comprises a chassis, the chassis reconfigurable between a semi-trailer chassis for transportation and a bearing surface for support against ground during operation.

15. The system of claim 14, wherein the chassis is a rock-over chassis.

16. The system of claim 14, wherein the chassis comprises a wheeled portion movable relative to a bearing surface portion between a first position and a second position, the wheeled portion configured to engage ground in the first position for transportation, the wheeled portion configured to retract from ground in the second position to facilitate engagement of ground by the bearing surface portion.

17. The system of claim 1, further comprising a mobile in-feed conveyor module, the mobile in-feed conveyor module configured as a self-propelled mobile module and comprising a conveyor for feeding granular material to the plurality of the mobile storage modules.

18. The system of claim 17, wherein the mobile support unit module is further configured as the mobile in-feed conveyor module.

19. A method for handling granular material, the method comprising:
   a. providing a delivery module configured to receive said granular material and to convey said granular material to a predetermined delivery location;
   b. providing one or more mobile storage modules adjacent to the delivery module, each of the one or more mobile storage modules configured to hold and dispense said granular material downward to the delivery module at a non-vertical orientation; and
   c. controlling at least one of the delivery module and the plurality of mobile storage modules with a remotely controllable, self-propelled mobile support unit module, the remotely controllable, self-propelled mobile support unit module being configured to provide power and control signals to one or more of the delivery module and the plurality of mobile storage modules, the control signals automatically or semi-automatically generated by a remote control module integrated with or operatively coupled to the mobile support unit module, the mobile support unit module further comprising an engine and a transmission system and configured for towing one or more of the delivery module and the plurality of mobile storage modules.

20. The method of claim 19, wherein the remote control module is further configured to facilitate automatically coordinated control of one or more of the delivery module and mobile storage modules.

21. The method of claim 19, wherein the mobile support unit module comprises one or more hydraulic power packs configured to provide said power.

22. The method of claim 19, wherein the mobile support unit module comprises a radiofrequency interface configured to facilitate remote control of the mobile support unit module.

23. The method of claim 19, wherein the mobile support unit module is configured to operate as a source of heat for heating other equipment, equipment engines, materials handled by the system, working fluids, or a combination thereof.

24. The method of claim 19, wherein the mobile support unit module is configured to operate as a source of starting power for the one or more other system components.

25. The method according to claim 19, wherein each of the one or more storage modules are reconfigurable between a mobile storage module operational configuration and a mobile storage module transportation configuration, the mobile storage modules towable as separately transportable trailers in the mobile storage module transportation configuration, the method further comprising:
   a. transporting the one or more mobile storage modules to positions adjacent to the delivery module in the mobile storage module transportation configurations; and
   b. reconfiguring the one or more mobile storage modules to the mobile storage module operational configurations.

26. The method of claim 19, further comprising providing a mobile in-feed conveyor module, the mobile in-feed conveyor module configured as a self-propelled mobile module and comprising a conveyor for feeding granular material to the one or more mobile storage modules.

* * * * *